US010220346B2

(12) United States Patent
Fowler et al.

(10) Patent No.: US 10,220,346 B2
(45) Date of Patent: Mar. 5, 2019

(54) APPARATUS AND SYSTEM FOR SWING ADSORPTION PROCESSES RELATED THERETO

(71) Applicants: Tracy A. Fowler, Magnolia, TX (US); Richard A. Huntington, Spring, TX (US); John W. Fulton, Annandale, VA (US)

(72) Inventors: Tracy A. Fowler, Magnolia, TX (US); Richard A. Huntington, Spring, TX (US); John W. Fulton, Annandale, VA (US)

(73) Assignee: ExxonMobil Upstream Research Company, Spring, TX (US)

( * ) Notice: Subject to any disclaimer, the term of this patent is extended or adjusted under 35 U.S.C. 154(b) by 84 days.

(21) Appl. No.: 15/284,982

(22) Filed: Oct. 4, 2016

(65) Prior Publication Data

US 2017/0113173 A1    Apr. 27, 2017

Related U.S. Application Data

(60) Provisional application No. 62/246,922, filed on Oct. 27, 2015.

(51) Int. Cl.
 *B01D 53/04* (2006.01)
 *B01D 53/047* (2006.01)
(52) U.S. Cl.
 CPC ....... *B01D 53/047* (2013.01); *B01D 53/0407* (2013.01); *B01D 53/0446* (2013.01);
 (Continued)
(58) Field of Classification Search
 CPC .............. B01D 53/047; B01D 53/0407; B01D 53/0446; B01D 53/0462; B01D 53/0473;
 (Continued)

(56) References Cited

U.S. PATENT DOCUMENTS

| 1,868,138 | A | 7/1932 | Fisk |
| 3,103,425 | A | 9/1963 | Meyer ............................. 55/62 |
| 3,124,152 | A | 3/1964 | Payne ........................ 137/269.5 |
| 3,142,547 | A | 7/1964 | Marsh et al. ..................... 55/26 |
| 3,508,758 | A | 4/1970 | Strub ............................. 277/15 |
| 3,602,247 | A | 8/1971 | Bunn et al. ................... 137/270 |
| 3,788,036 | A | 1/1974 | Lee et al. .......................... 55/25 |
| 3,925,041 | A | 12/1975 | Patterson et al. |

(Continued)

FOREIGN PATENT DOCUMENTS

| CA | 2297590 | 9/2000 |
| CA | 2237103 | 12/2001 |

(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.

(Continued)

*Primary Examiner* — Frank M Lawrence, Jr.
(74) *Attorney, Agent, or Firm* — ExxonMobil Upstream Research Company—Law Department

(57) ABSTRACT

Provided are apparatus and systems for performing a swing adsorption process. This swing adsorption process may involve passing streams through adsorbent bed units to treat the feed stream to remove certain contaminants from the stream. In the method and system, active valves may be used with passive valves to manage the flow of the streams through the adsorbent bed units.

30 Claims, 5 Drawing Sheets

(52) U.S. Cl.
CPC ..... *B01D 53/0462* (2013.01); *B01D 53/0473* (2013.01); *B01D 2256/245* (2013.01); *B01D 2257/504* (2013.01); *B01D 2257/702* (2013.01); *B01D 2257/80* (2013.01); *B01D 2259/40003* (2013.01); *B01D 2259/40028* (2013.01); *B01D 2259/40043* (2013.01); *Y02C 10/08* (2013.01)

(58) Field of Classification Search
CPC ........ B01D 2256/245; B01D 2257/504; B01D 2257/702; B01D 2257/80; B01D 2259/40003; B01D 2259/40028; B01D 2259/40043
USPC ............. 95/96–98, 104, 105, 117, 139, 148; 96/108, 152
See application file for complete search history.

(56) References Cited

U.S. PATENT DOCUMENTS

| | | | |
|---|---|---|---|
| 3,967,464 A | 7/1976 | Cormier et al. | 62/13 |
| 4,187,092 A | 2/1980 | Woolley | 62/48 |
| 4,261,815 A | 4/1981 | Kelland | 209/213 |
| 4,324,565 A | 4/1982 | Benkmann | 55/23 |
| 4,325,565 A | 4/1982 | Winchell | 280/282 |
| 4,329,162 A | 5/1982 | Pitcher | 55/523 |
| 4,340,398 A | 7/1982 | Doshi et al. | 55/25 |
| 4,386,947 A | 6/1983 | Mizuno et al. | 55/387 |
| 4,445,441 A | 5/1984 | Tanca | 110/165 |
| 4,461,630 A | 7/1984 | Cassidy et al. | 55/25 |
| 4,496,376 A | 1/1985 | Hradek | 55/163 |
| 4,631,073 A * | 12/1986 | Null | B01D 53/0446 95/1 |
| 4,705,627 A | 11/1987 | Miwa et al. | 210/264 |
| 4,711,968 A | 12/1987 | Oswald et al. | 568/454 |
| 4,737,170 A | 4/1988 | Searle | 55/179 |
| 4,770,676 A | 9/1988 | Sircar et al. | 55/26 |
| 4,783,205 A | 11/1988 | Searle | 55/161 |
| 4,784,672 A | 11/1988 | Sircar | 55/26 |
| 4,790,272 A | 12/1988 | Woolenweber | 123/188 |
| 4,814,146 A | 3/1989 | Brand et al. | 422/179 |
| 4,816,039 A | 3/1989 | Krishnamurthy et al. | 55/26 |
| 4,877,429 A | 10/1989 | Hunter | 55/162 |
| 4,977,745 A | 12/1990 | Heichberger | 62/10 |
| 5,110,328 A | 5/1992 | Yokota et al. | 55/180 |
| 5,125,934 A | 6/1992 | Krishnamurthy et al. | 55/25 |
| 5,169,006 A | 12/1992 | Stelzer | 209/223.1 |
| 5,174,796 A | 12/1992 | Davis et al. | 55/26 |
| 5,224,350 A | 7/1993 | Mehra | 62/17 |
| 5,234,472 A | 8/1993 | Krishnamurthy et al. | 95/98 |
| 5,292,990 A | 3/1994 | Kantner et al. | 585/820 |
| 5,306,331 A | 4/1994 | Auvil et al. | 95/42 |
| 5,354,346 A | 10/1994 | Kumar | 95/101 |
| 5,365,011 A | 11/1994 | Ramachandran et al. | 585/829 |
| 5,370,728 A | 12/1994 | LaSala et al. | 95/101 |
| 5,486,227 A | 1/1996 | Kumar et al. | |
| 5,547,641 A | 8/1996 | Smith et al. | 422/181 |
| 5,565,018 A | 10/1996 | Baksh et al. | 95/100 |
| 5,672,196 A | 9/1997 | Acharya et al. | 95/97 |
| 5,700,310 A | 12/1997 | Bowman et al. | 95/45 |
| 5,733,451 A | 3/1998 | Coellner et al. | 210/496 |
| 5,735,938 A | 4/1998 | Baksh et al. | 95/101 |
| 5,750,026 A | 5/1998 | Gadkaree et al. | 201/502.1 |
| 5,769,928 A | 6/1998 | Leavitt | |
| 5,792,239 A | 8/1998 | Reinhold, III et al. | 95/101 |
| 5,807,423 A | 9/1998 | Lemcoff et al. | 95/96 |
| 5,811,616 A | 9/1998 | Holub et al. | 585/504 |
| 5,827,358 A | 10/1998 | Kulish et al. | 96/115 |
| 5,906,673 A | 5/1999 | Reinhold, III et al. | 95/45 |
| 5,912,426 A | 6/1999 | Smolarek et al. | |
| 5,924,307 A | 7/1999 | Nenov | 62/643 |
| 5,935,444 A | 8/1999 | Johnson et al. | 210/691 |
| 5,968,234 A | 10/1999 | Midgett, II et al. | 95/120 |
| 5,976,221 A | 11/1999 | Bowman et al. | 95/45 |
| 5,997,617 A | 12/1999 | Czabala et al. | 96/130 |
| 6,007,606 A | 12/1999 | Baksh et al. | 95/98 |
| 6,011,192 A | 1/2000 | Baker et al. | 585/818 |
| 6,023,942 A | 2/2000 | Thomas et al. | 62/613 |
| 6,053,966 A | 4/2000 | Moreau et al. | 95/96 |
| 6,063,161 A | 5/2000 | Keefer et al. | 95/100 |
| 6,096,115 A | 8/2000 | Kleinberg | |
| 6,099,621 A | 8/2000 | Ho | 95/139 |
| 6,129,780 A | 10/2000 | Millet et al. | 95/117 |
| 6,136,222 A | 10/2000 | Friesen et al. | 252/184 |
| 6,147,126 A | 11/2000 | DeGeorge et al. | 518/715 |
| 6,152,991 A | 11/2000 | Ackley | |
| 6,156,101 A | 12/2000 | Naheiri | |
| 6,171,371 B1 | 1/2001 | Derive et al. | 95/98 |
| 6,176,897 B1 | 1/2001 | Keefer | 95/98 |
| 6,179,900 B1 | 1/2001 | Behling et al. | 95/45 |
| 6,183,538 B1 | 2/2001 | Naheiri | |
| 6,194,079 B1 | 2/2001 | Hekal | 428/566 |
| 6,210,466 B1 | 4/2001 | Whysall et al. | 95/100 |
| 6,231,302 B1 | 5/2001 | Bonardi | 415/105 |
| 6,245,127 B1 | 6/2001 | Kane et al. | 95/101 |
| 6,284,021 B1 | 9/2001 | Lu et al. | 95/96 |
| 6,311,719 B1 | 11/2001 | Hill et al. | 137/312 |
| 6,345,954 B1 | 2/2002 | Al-Himyary et al. | 415/112 |
| 6,398,853 B1 | 6/2002 | Keefer et al. | 96/125 |
| 6,402,813 B2 | 6/2002 | Monereau et al. | 95/96 |
| 6,406,523 B1 | 6/2002 | Connor et al. | 96/125 |
| 6,425,938 B1 | 7/2002 | Xu et al. | |
| 6,432,379 B1 | 8/2002 | Heung | 423/648.1 |
| 6,436,171 B1 | 8/2002 | Wang et al. | 95/96 |
| 6,444,012 B1 | 9/2002 | Dolan et al. | 95/99 |
| 6,444,014 B1 | 9/2002 | Mullhaupt et al. | 95/130 |
| 6,444,523 B1 | 9/2002 | Fan et al. | 438/257 |
| 6,451,095 B1 | 9/2002 | Keefer et al. | 96/125 |
| 6,457,485 B2 | 10/2002 | Hill et al. | 137/240 |
| 6,471,744 B1 | 10/2002 | Hill | |
| 6,471,939 B1 | 10/2002 | Boix et al. | 423/706 |
| 6,488,747 B1 | 12/2002 | Keefer | 96/125 |
| 6,497,750 B2 | 12/2002 | Butwell et al. | 95/96 |
| 6,500,234 B1 | 12/2002 | Ackley et al. | |
| 6,500,241 B2 | 12/2002 | Reddy | 96/134 |
| 6,500,404 B1 | 12/2002 | Camblor Fernandez et al. | 423/706 |
| 6,503,299 B2 | 1/2003 | Baksh et al. | 95/98 |
| 6,506,351 B1 | 1/2003 | Jain et al. | 423/239.1 |
| 6,514,318 B2 | 2/2003 | Keefer | 95/96 |
| 6,514,319 B2 | 2/2003 | Keefer et al. | 95/101 |
| 6,517,609 B1 | 2/2003 | Monereau et al. | 95/96 |
| 6,531,516 B2 | 3/2003 | Davis et al. | 518/700 |
| 6,533,846 B1 | 3/2003 | Keefer et al. | 96/125 |
| 6,565,627 B1 | 5/2003 | Golden et al. | 95/96 |
| 6,565,635 B2 | 5/2003 | Keefer et al. | 96/125 |
| 6,565,825 B2 | 5/2003 | Ohji et al. | 423/625 |
| 6,572,678 B1 | 6/2003 | Wijmans et al. | 95/47 |
| 6,579,341 B2 | 6/2003 | Baker et al. | 95/39 |
| 6,593,541 B1 | 7/2003 | Herren | 219/121.67 |
| 6,595,233 B2 | 7/2003 | Pulli | 137/115.05 |
| 6,605,136 B1 | 8/2003 | Graham et al. | 95/98 |
| 6,607,584 B2 | 8/2003 | Moreau et al. | 95/117 |
| 6,630,012 B2 | 10/2003 | Wegeng et al. | 95/106 |
| 6,631,626 B1 | 10/2003 | Hahn | 62/612 |
| 6,641,645 B1 | 11/2003 | Lee et al. | 95/98 |
| 6,651,645 B1 | 11/2003 | Nunez-Suarez | 126/9 R |
| 6,660,064 B2 | 12/2003 | Golden et al. | 95/96 |
| 6,660,065 B2 | 12/2003 | Byrd et al. | 95/117 |
| 6,692,626 B2 | 2/2004 | Keefer et al. | 204/491 |
| 6,712,087 B2 | 3/2004 | Hill et al. | 137/240 |
| 6,742,507 B2 | 6/2004 | Keefer et al. | 123/585 |
| 6,746,515 B2 | 6/2004 | Wegeng et al. | 95/96 |
| 6,752,852 B1 | 6/2004 | Jacksier et al. | 95/117 |
| 6,770,120 B2 | 8/2004 | Neu et al. | 95/96 |
| 6,773,225 B2 | 8/2004 | Yuri et al. | 415/1 |
| 6,802,889 B2 | 10/2004 | Graham et al. | 95/96 |
| 6,814,771 B2 | 11/2004 | Scardino et al. | 55/385.3 |
| 6,835,354 B2 | 12/2004 | Woods et al. | 422/139 |
| 6,840,985 B2 | 1/2005 | Keefer | 96/125 |
| 6,866,950 B2 | 3/2005 | Connor et al. | 429/13 |
| 6,889,710 B2 | 5/2005 | Wagner | 137/625.46 |
| 6,890,376 B2 | 5/2005 | Arquin et al. | 96/134 |

(56) References Cited

U.S. PATENT DOCUMENTS

| | | |
|---|---|---|
| 6,893,483 B2 | 5/2005 | Golden et al. .................... 95/96 |
| 6,902,602 B2 | 6/2005 | Keefer et al. .................... 95/97 |
| 6,916,358 B2 | 7/2005 | Nakamura et al. ............... 95/96 |
| 6,918,953 B2 * | 7/2005 | Lomax, Jr. ......... B01D 53/0446 95/96 |
| 6,921,597 B2 | 7/2005 | Keefer et al. .................... 429/34 |
| 6,974,496 B2 | 12/2005 | Wegeng et al. ................. 96/126 |
| 7,025,801 B2 | 4/2006 | Monereau .......................... 95/8 |
| 7,027,929 B2 | 4/2006 | Wang ............................... 702/17 |
| 7,029,521 B2 | 4/2006 | Johansson ...................... 96/128 |
| 7,074,323 B2 | 7/2006 | Ghijsen ......................... 208/101 |
| 7,077,891 B2 | 7/2006 | Jaffe et al. ...................... 96/108 |
| 7,087,331 B2 | 8/2006 | Keefer et al. .................... 429/17 |
| 7,094,275 B2 | 8/2006 | Keefer et al. ................... 96/125 |
| 7,097,925 B2 | 8/2006 | Keefer et al. ...................... 429/9 |
| 7,112,239 B2 | 9/2006 | Kimbara et al. ................ 96/108 |
| 7,117,669 B2 | 10/2006 | Kaboord et al. ................. 60/288 |
| 7,122,073 B1 | 10/2006 | Notaro et al. |
| 7,128,775 B2 | 10/2006 | Celik et al. ...................... 95/96 |
| 7,144,016 B2 | 12/2006 | Gozdawa ....................... 277/399 |
| 7,160,356 B2 | 1/2007 | Koros et al. ...................... 95/50 |
| 7,160,359 B2 * | 1/2007 | Vincent ................. B01D 35/02 222/189.06 |
| 7,160,367 B2 | 1/2007 | Babicki et al. ................. 96/116 |
| 7,166,149 B2 | 1/2007 | Dunne et al. ................... 95/113 |
| 7,172,645 B1 | 2/2007 | Pfister et al. ................... 95/116 |
| 7,189,280 B2 | 3/2007 | Alizadeh-Khiavi et al. ... 95/130 |
| 7,250,073 B2 | 7/2007 | Keefer et al. .................... 95/96 |
| 7,250,074 B2 | 7/2007 | Tonkovich et al. ............. 95/130 |
| 7,255,727 B2 | 8/2007 | Monereau et al. .............. 95/96 |
| 7,258,725 B2 | 8/2007 | Ohmi et al. ...................... 95/41 |
| 7,276,107 B2 | 10/2007 | Baksh et al. ..................... 95/96 |
| 7,279,029 B2 | 10/2007 | Occhialini et al. ............. 96/121 |
| 7,285,350 B2 | 10/2007 | Keefer et al. .................... 429/34 |
| 7,297,279 B2 | 11/2007 | Johnson et al. ............... 210/669 |
| 7,311,763 B2 | 12/2007 | Neary ............................. 96/121 |
| RE40,006 E | 1/2008 | Keefer et al. .................... 95/100 |
| 7,314,503 B2 | 1/2008 | Landrum et al. ................. 95/50 |
| 7,354,562 B2 | 4/2008 | Ying et al. ................. 423/437.2 |
| 7,387,849 B2 | 6/2008 | Keefer et al. .................... 429/34 |
| 7,390,350 B2 | 6/2008 | Weist, Jr. et al. ............... 95/100 |
| 7,404,846 B2 | 7/2008 | Golden et al. ................... 95/103 |
| 7,438,079 B2 | 10/2008 | Cohen et al. |
| 7,449,049 B2 | 11/2008 | Thomas et al. ................. 95/123 |
| 7,456,131 B2 | 11/2008 | Klett et al. .................... 502/417 |
| 7,510,601 B2 | 3/2009 | Whitley et al. ................. 96/121 |
| 7,527,670 B2 | 5/2009 | Ackley et al. ................... 95/96 |
| 7,553,568 B2 | 6/2009 | Keefer ............................. 429/13 |
| 7,578,864 B2 | 8/2009 | Watanabe et al. .............. 55/523 |
| 7,604,682 B2 | 10/2009 | Seaton ............................. 95/96 |
| 7,637,989 B2 | 12/2009 | Bong ............................. 96/130 |
| 7,641,716 B2 | 1/2010 | Lomax, Jr. et al. ............. 95/96 |
| 7,645,324 B2 | 1/2010 | Rode et al. ...................... 95/96 |
| 7,651,549 B2 | 1/2010 | Whitley ........................... 95/96 |
| 7,674,319 B2 | 3/2010 | Lomax, Jr. et al. .............. 95/19 |
| 7,674,539 B2 | 3/2010 | Keefer et al. .................... 429/17 |
| 7,687,044 B2 | 3/2010 | Keefer et al. .................. 422/211 |
| 7,713,333 B2 | 5/2010 | Rege et al. ...................... 95/96 |
| 7,717,981 B2 | 5/2010 | LaBuda et al. .................. 95/96 |
| 7,722,700 B2 | 5/2010 | Sprinkle .......................... 95/22 |
| 7,731,782 B2 | 6/2010 | Kelley et al. .................. 95/139 |
| 7,740,687 B2 | 6/2010 | Reinhold, III .................. 95/96 |
| 7,744,676 B2 | 6/2010 | Leitmayr et al. ................ 95/99 |
| 7,744,677 B2 | 6/2010 | Barclay et al. ................. 95/114 |
| 7,758,051 B2 | 7/2010 | Roberts-Haritonov et al. ............ 277/401 |
| 7,758,988 B2 | 7/2010 | Keefer et al. .................... 429/34 |
| 7,763,098 B2 | 7/2010 | Alizadeh-Khiavi et al. ..... 95/96 |
| 7,763,099 B2 | 7/2010 | Verma et al. .................... 95/96 |
| 7,792,983 B2 | 9/2010 | Mishra et al. ................ 709/231 |
| 7,793,675 B2 | 9/2010 | Cohen et al. |
| 7,806,965 B2 | 10/2010 | Stinson ........................... 95/187 |
| 7,819,948 B2 | 10/2010 | Wagner ........................... 95/100 |
| 7,828,877 B2 | 11/2010 | Sawada et al. .................. 95/96 |
| 7,828,880 B2 | 11/2010 | Moriya et al. .................. 95/210 |
| 7,854,793 B2 | 12/2010 | Rarig et al. ..................... 96/116 |
| 7,858,169 B2 | 12/2010 | Yamashita ..................... 428/116 |
| 7,862,645 B2 | 1/2011 | Whitley et al. .................. 95/96 |
| 7,867,320 B2 | 1/2011 | Baksh et al. ..................... 95/96 |
| 7,902,114 B2 | 3/2011 | Keefer et al. |
| 7,938,886 B2 | 5/2011 | Hershkowitz et al. ......... 95/115 |
| 7,947,118 B2 | 5/2011 | Rarig et al. ...................... 95/98 |
| 7,947,120 B2 | 5/2011 | Deckman et al. .............. 95/139 |
| 7,959,720 B2 | 6/2011 | Deckman et al. .............. 96/130 |
| 8,016,918 B2 | 9/2011 | LaBuda et al. .................. 95/96 |
| 8,034,164 B2 | 10/2011 | Lomax, Jr. et al. ............ 95/121 |
| 8,071,063 B2 | 12/2011 | Reyes et al. ................... 423/248 |
| 8,128,734 B2 | 3/2012 | Song ............................... 95/96 |
| 8,142,745 B2 | 3/2012 | Reyes et al. ................ 423/213.2 |
| 8,142,746 B2 | 3/2012 | Reyes et al. ................ 423/213.2 |
| 8,192,709 B2 | 6/2012 | Reyes et al. ................. 423/245.1 |
| 8,210,772 B2 | 7/2012 | Gillecriosd .................. 405/128.2 |
| 8,227,121 B2 | 7/2012 | Adams et al. ................. 429/429 |
| 8,262,773 B2 | 9/2012 | Northrop et al. ............... 95/114 |
| 8,262,783 B2 | 9/2012 | Stoner et al. ................... 96/108 |
| 8,268,043 B2 | 9/2012 | Celik et al. ...................... 95/96 |
| 8,268,044 B2 | 9/2012 | Wright et al. .................... 95/96 |
| 8,272,401 B2 | 9/2012 | McLean .................... 137/625.11 |
| 8,287,629 B2 | 10/2012 | Fujita et al. ................... 96/126 |
| 8,319,090 B2 | 11/2012 | Kitamura ...................... 136/244 |
| 8,337,594 B2 | 12/2012 | Corma Canos et al. ....... 95/130 |
| 8,361,200 B2 | 1/2013 | Sayari et al. ................... 95/139 |
| 8,361,205 B2 | 1/2013 | Desai et al. .................... 96/121 |
| 8,377,173 B2 | 2/2013 | Chuang ........................... 95/135 |
| 8,444,750 B2 | 5/2013 | Deckman et al. ................ 95/96 |
| 8,470,395 B2 | 6/2013 | Khiavi et al. .................. 427/180 |
| 8,480,795 B2 | 7/2013 | Siskin et al. ................... 95/235 |
| 8,512,569 B2 | 8/2013 | Eaton et al. ................... 210/650 |
| 8,518,356 B2 | 8/2013 | Schaffer et al. ............... 423/220 |
| 8,529,662 B2 | 9/2013 | Kelley et al. .................... 95/96 |
| 8,529,663 B2 | 9/2013 | Reyes et al. ..................... 95/96 |
| 8,529,664 B2 | 9/2013 | Deckman et al. ................ 95/96 |
| 8,529,665 B2 | 9/2013 | Manning et al. ................ 95/96 |
| 8,535,414 B2 | 9/2013 | Johnson et al. .................. 95/95 |
| 8,545,602 B2 | 10/2013 | Chance et al. ................... 95/96 |
| 8,551,444 B2 | 10/2013 | Agnihotri et al. ........... 423/648.1 |
| 8,573,124 B2 | 11/2013 | Havran et al. ................. 102/206 |
| 8,591,627 B2 | 11/2013 | Jain ................................. 95/52 |
| 8,591,634 B2 | 11/2013 | Winchester et al. ............ 96/127 |
| 8,616,233 B2 | 12/2013 | McLean et al. ......... 137/246.22 |
| 8,657,922 B2 | 2/2014 | Yamawaki et al. .............. 95/96 |
| 8,673,059 B2 | 3/2014 | Leta et al. ...................... 95/104 |
| 8,680,344 B2 | 3/2014 | Weston et al. |
| 8,715,617 B2 | 5/2014 | Genkin et al. ................. 423/652 |
| 8,752,390 B2 | 6/2014 | Wright et al. .................. 60/780 |
| 8,778,051 B2 | 7/2014 | Weist, Jr. et al. ............... 95/98 |
| 8,784,533 B2 | 7/2014 | Leta et al. ....................... 95/97 |
| 8,784,534 B2 | 7/2014 | Kamakoti et al. ............... 95/97 |
| 8,784,535 B2 | 7/2014 | Ravikovitch et al. ........... 95/98 |
| 8,795,411 B2 | 8/2014 | Hufton et al. ................... 95/90 |
| 8,808,425 B2 | 8/2014 | Genkin et al. ................... 95/96 |
| 8,808,426 B2 | 8/2014 | Sundaram ....................... 95/96 |
| 8,814,985 B2 | 8/2014 | Gerds et al. ..................... 95/90 |
| 8,852,322 B2 | 10/2014 | Gupta et al. ................... 95/136 |
| 8,858,683 B2 | 10/2014 | Deckman ........................ 95/96 |
| 8,875,483 B2 | 11/2014 | Wettstein .................... 60/39.52 |
| 8,906,138 B2 | 12/2014 | Rasmussen et al. ............. 95/96 |
| 8,921,637 B2 | 12/2014 | Sundaram et al. ............ 585/823 |
| 8,939,014 B2 | 1/2015 | Kamakoti et al. ............... 73/38 |
| 9,005,561 B2 | 4/2015 | Leta |
| 9,017,457 B2 | 4/2015 | Tammera ......................... 95/96 |
| 9,028,595 B2 | 5/2015 | Sundaram et al. |
| 9,034,078 B2 | 5/2015 | Wanni et al. ...................... 95/8 |
| 9,034,079 B2 | 5/2015 | Deckman et al. ................ 95/96 |
| 9,050,553 B2 | 6/2015 | Alizadeh-Khiavi et al. |
| 9,067,168 B2 | 6/2015 | Frederick et al. .............. 96/108 |
| 9,095,809 B2 | 8/2015 | Deckman et al. ................ 95/45 |
| 9,108,145 B2 | 8/2015 | Kalbassi et al. ................... 95/8 |
| 9,120,049 B2 | 9/2015 | Sundaram et al. ............. 96/121 |
| 9,126,138 B2 | 9/2015 | Deckman et al. ................ 95/95 |
| 9,162,175 B2 | 10/2015 | Sundaram ...................... 96/121 |
| 9,168,485 B2 | 10/2015 | Deckman et al. ................ 95/96 |
| 2001/0047824 A1 | 12/2001 | Hill et al. ...................... 137/312 |
| 2002/0053547 A1 | 5/2002 | Schlegel et al. |

(56) References Cited

U.S. PATENT DOCUMENTS

| | | | |
|---|---|---|---|
| 2002/0124885 A1 | 9/2002 | Hill et al. ............... 137/312 |
| 2002/0162452 A1 | 11/2002 | Butwell et al. ............... 95/96 |
| 2003/0075485 A1 | 4/2003 | Ghijsen ............... 208/308 |
| 2003/0129101 A1 | 7/2003 | Zettel ............... 422/179 |
| 2003/0131728 A1 | 7/2003 | Kanazirev et al. ............... 95/96 |
| 2003/0170527 A1 | 9/2003 | Finn et al. ............... 429/34 |
| 2003/0202918 A1 | 10/2003 | Ashida et al. ............... 422/180 |
| 2003/0205130 A1 | 11/2003 | Neu et al. ............... 95/90 |
| 2003/0223856 A1 | 12/2003 | Yuri et al. ............... 415/1 |
| 2004/0099142 A1 | 5/2004 | Arquin et al. ............... 96/134 |
| 2004/0118277 A1 | 6/2004 | Kim |
| 2004/0197596 A1 | 10/2004 | Connor et al. ............... 428/630 |
| 2004/0232622 A1 | 11/2004 | Gozdawa ............... 277/401 |
| 2005/0005771 A1 | 1/2005 | Lomax, Jr. et al. |
| 2005/0045041 A1* | 3/2005 | Hechinger ......... B01D 53/0415 96/121 |
| 2005/0109419 A1 | 5/2005 | Ohmi et al. ............... 141/4 |
| 2005/0114032 A1 | 5/2005 | Wang ............... 702/14 |
| 2005/0129952 A1 | 6/2005 | Sawada et al. ............... 428/409 |
| 2005/0014511 A1 | 7/2005 | Keefer et al. ............... 96/124 |
| 2005/0145111 A1 | 7/2005 | Keefer et al. ............... 96/124 |
| 2005/0150378 A1 | 7/2005 | Dunne et al. ............... 95/113 |
| 2005/0229782 A1 | 10/2005 | Monereau et al. ............... 95/96 |
| 2005/0252378 A1 | 11/2005 | Celik et al. ............... 96/121 |
| 2006/0017940 A1 | 1/2006 | Takayama |
| 2006/0048644 A1* | 3/2006 | Dolensky ............... A62B 21/00 95/96 |
| 2006/0048648 A1 | 3/2006 | Gibbs et al. ............... 96/108 |
| 2006/0049102 A1 | 3/2006 | Miller et al. ............... 210/500.27 |
| 2006/0076270 A1 | 4/2006 | Poshusta et al. ............... 208/208 |
| 2006/0099096 A1 | 5/2006 | Shaffer et al. ............... 418/55.1 |
| 2006/0105158 A1 | 5/2006 | Fritz et al. ............... 428/317.9 |
| 2006/0162556 A1 | 7/2006 | Ackley et al. ............... 95/96 |
| 2006/0165574 A1 | 7/2006 | Sayari ............... 423/210 |
| 2006/0169142 A1 | 8/2006 | Rode et al. ............... 96/129 |
| 2006/0236862 A1 | 10/2006 | Golden et al. ............... 95/96 |
| 2007/0084241 A1 | 4/2007 | Kretchmer ............... 63/29.2 |
| 2007/0084344 A1 | 4/2007 | Moriya et al. ............... 95/210 |
| 2007/0222160 A1 | 9/2007 | Roberts-Haritonov et al. ............... 277/387 |
| 2007/0253872 A1 | 11/2007 | Keefer et al. ............... 422/143 |
| 2007/0261550 A1 | 11/2007 | Ota |
| 2007/0261557 A1 | 11/2007 | Gadkaree et al. ............... 96/121 |
| 2007/0283807 A1 | 12/2007 | Whitley ............... 95/96 |
| 2008/0051279 A1 | 2/2008 | Klett et al. ............... 502/60 |
| 2008/0072822 A1 | 3/2008 | White ............... 118/722 |
| 2008/0128655 A1 | 6/2008 | Garg et al. ............... 252/373 |
| 2008/0282883 A1 | 11/2008 | Rarig et al. ............... 95/96 |
| 2008/0282884 A1 | 11/2008 | Kelley et al. ............... 95/96 |
| 2008/0282885 A1 | 11/2008 | Deckman et al. ............... 95/98 |
| 2008/0282886 A1 | 11/2008 | Reyes et al. ............... 95/98 |
| 2008/0282887 A1 | 11/2008 | Chance et al. ............... 95/98 |
| 2008/0282892 A1 | 11/2008 | Deckman et al. ............... 96/140 |
| 2008/0289497 A1 | 11/2008 | Barclay et al. ............... 95/114 |
| 2008/0307966 A1 | 12/2008 | Stinson ............... 95/187 |
| 2008/0314550 A1 | 12/2008 | Greco ............... 165/4 |
| 2009/0004073 A1 | 1/2009 | Gleize et al. ............... 422/180 |
| 2009/0014902 A1 | 1/2009 | Koivunen et al. ............... 265/11 |
| 2009/0025553 A1 | 1/2009 | Keefer et al. ............... 95/96 |
| 2009/0025555 A1 | 1/2009 | Lively et al. |
| 2009/0037550 A1 | 2/2009 | Mishra et al. ............... 708/208 |
| 2009/0071333 A1 | 3/2009 | LaBuda et al. ............... 95/96 |
| 2009/0079870 A1 | 3/2009 | Matsui ............... 348/558 |
| 2009/0107332 A1 | 4/2009 | Wagner ............... 95/100 |
| 2009/0151559 A1 | 6/2009 | Verma et al. ............... 95/96 |
| 2009/0162268 A1 | 6/2009 | Hufton et al. ............... 423/210 |
| 2009/0180423 A1 | 7/2009 | Kroener ............... 370/328 |
| 2009/0241771 A1 | 10/2009 | Manning et al. ............... 95/15 |
| 2009/0284013 A1 | 11/2009 | Anand et al. ............... 290/52 |
| 2009/0294366 A1 | 12/2009 | Wright et al. |
| 2009/0308248 A1 | 12/2009 | Siskin et al. ............... 95/236 |
| 2009/0314159 A1 | 12/2009 | Haggerty ............... 95/90 |
| 2010/0059701 A1 | 3/2010 | McLean ............... 251/304 |
| 2010/0077920 A1 | 4/2010 | Baksh et al. ............... 95/97 |
| 2010/0089241 A1 | 4/2010 | Stoner et al. ............... 96/125 |
| 2010/0186445 A1 | 7/2010 | Minta et al. ............... 62/606 |
| 2010/0212493 A1 | 8/2010 | Rasmussen et al. ............... 95/45 |
| 2010/0251887 A1 | 10/2010 | Jain ............... 95/46 |
| 2010/0252497 A1 | 10/2010 | Ellison et al. ............... 210/500.1 |
| 2010/0263534 A1 | 10/2010 | Chuang ............... 95/139 |
| 2010/0282593 A1 | 11/2010 | Speirs et al. ............... 203/11 |
| 2010/0288704 A1 | 11/2010 | Amsden et al. ............... 210/688 |
| 2011/0011803 A1 | 1/2011 | Koros |
| 2011/0031103 A1 | 2/2011 | Deckman et al. ............... 203/41 |
| 2011/0067440 A1 | 3/2011 | Van Aken ............... 62/613 |
| 2011/0067770 A1 | 3/2011 | Pederson et al. ............... 137/625.15 |
| 2011/0146494 A1 | 6/2011 | Desai et al. ............... 96/115 |
| 2011/0217218 A1 | 9/2011 | Gupta et al. ............... 423/228 |
| 2011/0277620 A1 | 11/2011 | Havran et al. ............... 89/1.14 |
| 2011/0291051 A1 | 12/2011 | Hershkowitz et al. ............... 252/373 |
| 2011/0296871 A1 | 12/2011 | Van Soest-Vercammen et al. ............... 62/636 |
| 2011/0308524 A1 | 12/2011 | Brey et al. ............... 128/205.12 |
| 2012/0024152 A1 | 2/2012 | Yamawaki et al. ............... 95/96 |
| 2012/0031144 A1 | 2/2012 | Northrop et al. ............... 62/617 |
| 2012/0067216 A1 | 3/2012 | Corma-Canos et al. ............... 95/95 |
| 2012/0152115 A1 | 6/2012 | Gerds et al. ............... 95/90 |
| 2012/0222551 A1 | 9/2012 | Deckman ............... 95/96 |
| 2012/0222552 A1 | 9/2012 | Ravikovitch et al. ............... 95/97 |
| 2012/0222553 A1 | 9/2012 | Kamakoti et al. ............... 95/99 |
| 2012/0222554 A1 | 9/2012 | Leta et al. ............... 95/104 |
| 2012/0222555 A1 | 9/2012 | Gupta et al. ............... 95/136 |
| 2012/0255377 A1 | 10/2012 | Kamakoti et al. ............... 73/863.23 |
| 2012/0308456 A1 | 12/2012 | Leta et al. ............... 423/228 |
| 2012/0312163 A1 | 12/2012 | Leta et al. ............... 95/97 |
| 2013/0061755 A1 | 3/2013 | Frederick et al. ............... 96/110 |
| 2013/0216627 A1 | 8/2013 | Galbraith et al. |
| 2013/0225898 A1 | 8/2013 | Sundaram et al. ............... 585/802 |
| 2013/0340619 A1 | 12/2013 | Tammera |
| 2014/0013955 A1 | 1/2014 | Tammera et al. ............... 95/115 |
| 2014/0060326 A1 | 3/2014 | Sundaram ............... 95/96 |
| 2014/0157986 A1 | 6/2014 | Ravikovitch et al. ............... 95/96 |
| 2014/0208797 A1 | 7/2014 | Kelley et al. ............... 62/611 |
| 2014/0216254 A1 | 8/2014 | Tammera et al. ............... 95/114 |
| 2015/0013377 A1 | 1/2015 | Oelfke |
| 2015/0068397 A1 | 3/2015 | Boulet et al. |
| 2015/0196870 A1 | 7/2015 | Albright et al. |

FOREIGN PATENT DOCUMENTS

| | | |
|---|---|---|
| EP | 0257493 | 2/1988 |
| EP | 0426937 | 5/1991 |
| EP | 1018359 | 7/2000 |
| EP | 1577561 | 9/2005 |
| EP | 1674555 | 6/2006 |
| EP | 2823872 | 1/2015 |
| FR | 2924951 | 6/2009 |
| FR | 2 988 623 | 10/2013 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| WO | WO 99/28013 | 6/1999 |
| WO | WO2002/024309 | 3/2002 |
| WO | WO2002/073728 | 9/2002 |
| WO | WO2005/090793 | 9/2005 |
| WO | WO2011/139894 | 11/2011 |

OTHER PUBLICATIONS

ExxonMobil Research and Engineering and Xebec (2008) RCPSA—Rapid Cycle Pressure Swing Adsorption—An Advanced, Low-Cost Commercialized H2 Recovery Process, *Brochure*, 2 pages.

(56) References Cited

OTHER PUBLICATIONS

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.
Farooq, S. et al. (1990) "Continuous Contercurrent Flow Model for a Bulk PSA Separation Process," *AIChE J.*, v36 (2) p. 310-314.
FlowServe (2005)"Exceeding Expectations, US Navy Cuts Maintenance Costs With Flowserve GX-200 Non-Contacting Seal Retrofits," *Face-to-Face*, v17.1, 8 pgs.
GE Oil & Gas (2007) "Dry Gas Seal Retrofit," Florene, Italy, www.ge.com/oilandgas, 4 pgs.
Hopper, B. et al. (2008) "World's First 10,000 psi Sour Gas Injection Compressor," *Proceedings of the $37^{th}$ Turbomachinery Symosium*, pp. 73-95.
Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.
Rameshni, Mahin (May 19, 2007) "Strategies for Sour Gas Field Developments," *Worley Parsons-Brochure*, 20 pgs.
Reyes, S. C. et al. (1997) "Frequency Modulation Methods for Diffusion and Adsorption Measurements in Porous Solids," *J. Phys. Chem. B.* v101, pp. 614-622.
Ruthven, D. M. et al. (1996) "Performance of a Parallel Passage Adsorbent Contactor," *Gas. Sep. Purif.*, vol. 10, No. 1, pp. 63-73.
Stahley, J. S. (2003) "Design, Operation, and Maintenance Considerations for Improved Dry Gas Seal Realiability in Centrifugal Compressors," *Dresser-Rand, Tech. Paper* 134, 15 pages.
Suzuki, M. (1985) "Continuous-Countercurrent-Flow Approximation for Dynamic Steady State Profile of Pressure Swing Adsorption" *AIChE Symp. Ser.* v81 (242) pp. 67-73.

\* cited by examiner

APPARATUS AND SYSTEM FOR SWING ADSORPTION PROCESSES RELATED THERETO

CROSS-REFERENCE TO RELATED APPLICATION

This application claims the benefit of U.S. Provisional Patent Application 62/246,922, filed Oct. 27, 2015, entitled APPARATUS AND SYSTEM FOR SWING ADSORPTION PROCESSES RELATED THERETO, the entirety of which is incorporated by reference herein.

FIELD

The present techniques relate to a system associated with swing adsorption processes. In particular, the system includes a swing adsorption process for treating streams to remove contaminants from the stream.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle temperature swing adsorption (RCTSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gas components being more readily adsorbed within the pore structure or free volume of an adsorbent material when the gas components are under pressure. In particular, the higher the gas pressure, the greater the amount of readily-adsorbed gas adsorbed. When the pressure is reduced, the adsorbed component is released, or desorbed from the adsorbent material.

The swing adsorption processes (e.g., PSA and/or TSA) may be used to separate gas components of a gas mixture because different gas components tend to fill the micropore of the adsorbent material to different extents. For example, if a gas mixture, such as natural gas, is passed under pressure through an adsorbent bed unit or vessel containing an adsorbent material that is more selective towards carbon dioxide than it is for methane, at least a portion of the carbon dioxide is selectively adsorbed by the adsorbent material, and the stream exiting the vessel is enriched in methane. When the adsorbent material on the adsorbent bed reaches the end of its capacity to adsorb carbon dioxide, it is regenerated by reducing the pressure, thereby releasing the adsorbed carbon dioxide. Then, the adsorbent material is typically purged and repressurized prior to starting another adsorption cycle.

The swing adsorption processes typically involve adsorbent bed units, which include adsorbent beds disposed within a housing and configured to maintain fluids at various pressures for different steps in a cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms, structured beds or the like.

Further, various adsorbent bed units may be coupled together with conduits and valves to manage the flow of fluids through the cycle. Orchestrating these adsorbent bed units involves coordinating the steps in the cycle for each of the adsorbent bed units with other adsorbent bed units in the system. A complete cycle can vary from seconds to minutes as it transfers a plurality of gaseous streams through one or more of the adsorbent bed units.

Rapid cycle swing adsorption processing involves significant footprint or layout area for the valves relative to the available interface cross sectional area of the adsorbent bed. This constraint on the footprint is further complicated by the processing operations, such as dehydration for subsequent cryogenic processes, if pressure drop is to be minimized. Without an optimum arrangement, the required valve footprint may cause the valves to dominate the size of the adsorbent bed units, making the configuration less practical and expensive. Large valves are typically less effective in using the valve footprint (e.g., valve cross-sectional area) because the flow occurs around the periphery of the valve opening for certain types of valves, such as poppet valves. This may result in poor distribution of the flow uniformly across the interface of the adsorbent bed. Also, large poppet valves are limited with respect to the valve opening profile, which limits the flow profiles that can be generated.

To optimize the cycle timing for a swing adsorption process, actively controlled valve actuators are required. The valves have to be forced against seating surfaces to seal properly. At conventional swing adsorption processing pressures, the actuators may involve significant force to open the valve against the pressure and to close the valve against its seat. The necessary mechanism to handle these valve adjustments contributes to bulk (e.g., supporting equipment footprint) and costs in proportion to valve footprint and gas pressure, which is further complicated at higher pressures. For example, the pressure swing process involves changes in pressure between the various steps (e.g., feed or adsorption step and purge step) to move the volume of gas enclosed in the adsorbent bed unit. The differential pressures used for the swing adsorption processes may cause flows for the various steps to reach sonic velocity across the valve seats.

Accordingly, there remains a need in the industry for apparatus, methods, and systems that provided enhancements to the processing of feed streams in gas processing systems. Further, a need exists for a reduction in cost, size, and weight of facilities for treatment of gas streams, which may also minimize problems during pressure swings from valve opening in a swing adsorption process.

SUMMARY OF THE INVENTION

In one or more embodiments, the present techniques comprise a process for removing contaminants from a feed stream. The process comprising: a) performing one or more adsorption steps in an adsorbent bed unit, wherein each of the one or more adsorption steps comprise: (i) opening one or more actively-controlled feed poppet valves to pass a gaseous feed stream from a feed inlet conduit to an adsorbent bed disposed in an interior region of a housing of the adsorbent bed unit, (ii) exposing the gaseous feed stream to the adsorbent bed to separate one or more contaminants from the gaseous feed stream to form a product stream, and (iii) opening one or more passively-controlled product valves (such as poppet valves, check valves or reed valves) to conduct away the product stream from the interior region in the housing to a product conduit, wherein each of the one or more passively-controlled product valves operate in phase with at least one of the one or more actively-controlled feed poppet valves; b) performing one or more purge steps, wherein each of the one or more purge steps comprise passing a purge stream into the adsorbent bed unit to conduct away at least a portion of the one or more contaminants in a purge output stream; and c) repeating the steps a) to b) for at least one additional cycle, wherein cycle duration is for a period greater than 1 second and less than 600 seconds.

In yet another embodiment, a swing adsorption system for removing contaminants from a gaseous feed stream is described. The system comprising: an adsorbent bed unit configured to separate contaminants from a gaseous feed stream and to output a product stream in a swing adsorption process, wherein the adsorbent bed unit comprises: a housing forming an interior region; an adsorbent bed disposed within the interior region; one or more actively-controlled poppet valves, wherein each of the one or more actively-controlled poppet valves is configured to provide a first fluid flow passage through an opening in the housing via the actively-controlled poppet valve between the interior region and a first location external to the interior region; and one or more passively-controlled valves, wherein each of the one or more passively-controlled valves is configured to provide a second fluid flow passage through an opening in the housing via the passively-controlled valve between the interior region and a second location external to the interior region and wherein each of the one or more passively-controlled valves operate in phase with at least one of the one or more actively-controlled poppet valves.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
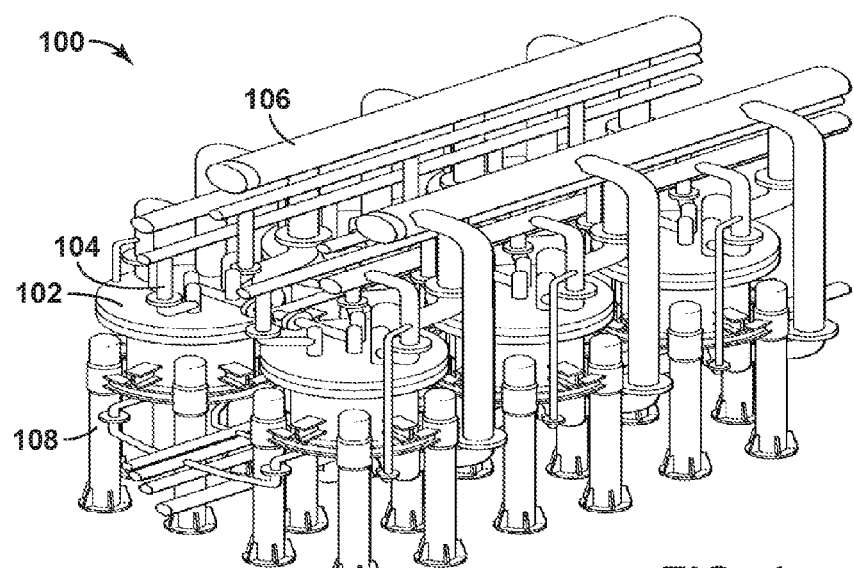
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

The term "in direct flow communication" or "in direct fluid communication" means in direct flow communication without intervening valves or other closure means for obstructing flow. As may be appreciated, other variations may also be envisioned within the scope of the present techniques.

The term "interface cross sectional area" means the cross sectional area of an end of the adsorbent bed where the stream enters or exits the adsorbent bed. For example, if a feed stream enters an adsorbent bed at a first end, the cross sectional area of the first end is the interface cross sectional area. As may be appreciated, other variations may also be envisioned within the scope of the present techniques.

As used herein, "conduit" refers to a tubular member forming a channel through which something, such as fluids, is conveyed. The conduit may include one or more of a pipe, a manifold, a tube or the like.

The term "in direct flow communication" or "in direct fluid communication" means in direct flow communication without intervening valves or other closure means for obstructing flow. As may be appreciated, other variations may also be envisioned within the scope of the present techniques.

The term "interface cross sectional area" means the cross sectional area of an end of the adsorbent bed where the stream enters or exits the adsorbent bed. For example, if a feed stream enters an adsorbent bed at a first end, the cross sectional area of the first end is the interface cross sectional area. As may be appreciated, other variations may also be envisioned within the scope of the present techniques.

The term "operate in phase" means two or more valves, such as two or more inlet valves or two or more outlet valves, opening and closing substantially together with at least 80% overlap, or preferably at least 90% overlap (with 100% overlap being identical or completely in phase). For example, considering the time interval during which a valve is in a certain state (e.g., open or closed), at least 80% or at least 90% of that time interval is common to all valves that are "in phase." As another example, if two valves are open for ten seconds, the valves overlap by at least 80% if the valves are both open at the same time for at least eight seconds. In certain embodiments of the present techniques, valves that are in phase may have a range of time to begin the travel from open to close. As an example, the first valve may begin opening at time 0 and the final valve in the same phase may begin opening at some time in the future $t_0$ (typically a small fraction of the valve open time or in some embodiments of the valve opening time) and still has the same fluid flow composition and direction. Valves that are in phase may or may not open to the same lift height. For valves that are in phase, the height from the valve with the highest lift height to the valve with the lowest lift height, the lowest lift height may be down to 20% or even 50% of lift height of the valve with the highest lift height.

The use of poppet valves is advantageous for adsorbent bed units because the valves involve a known configuration, provide tight sealing, and offer flexible timing of a cycle. For swing adsorption processes, the flexible timing may be useful for managing blow-down steps and re-pressurization steps, which are controlled through electro-hydraulic or electro-pneumatic mechanisms. However, as noted above, the pressures and flow rates involved in swing adsorption processes may involve poppet valves having a footprint that results in the poppet valves dominating the size of the adsorbent bed unit. In addition, as flow occurs around the periphery of the valve poppet, the size of the poppet valve may lead to difficulty distributing the flow uniformly across the interface of the adsorbent bed. Also, large poppet valves are limited with respect to the valve opening profile, which limits the flow profiles that can be generated.

To optimize the cycle timing, the valves in adsorbent bed units have actively-controlled valve actuators, which may be referred to as actively-controlled poppet valves. However, the present techniques involve a combination of actively-controlled poppet valves along with one or more passively-controlled valves, which may be a poppet valve, check valve or reed valve, to manage the flow of streams through the adsorbent bed. The passively-controlled valves may rely upon pressure differentials to open and/or close. By way of example, if the passively-actuated valves are poppet valves, the poppet valves are forced against the respective seating surfaces to close or prevent fluid flow. The passively-controlled poppet valves may lessen the mechanisms for the supporting equipment to manage the valve's position (e.g., open or closed). In addition, the use of passively-controlled valves may lessen the footprint and lower capital investment as compared to a conventional adsorbent bed units.

The present techniques include a swing adsorption system that includes one or more adsorbent bed units having one or more passively-controlled valves and one or more actively-controlled poppet valves to manage the flow of fluids through the adsorbent bed unit. The adsorbent bed unit may include a housing, which may include a head portion and other body portions, that forms a substantially gas impermeable partition. An adsorbent bed is disposed within the housing and adjacent to a plurality of valves (e.g., passively-controlled valves and/or actively-controlled poppet valves) providing fluid flow passages through openings in the housing between an interior region of the housing and locations external to the interior region of the housing. The configuration of the valves may be any variety of valve patterns or configuration of types of valves. As an example, the adsorbent bed unit may include one or more poppet valves, each in flow communication with a different conduit associated with different streams. The poppet valves may provide fluid communication between the adsorbent bed and one of the respective conduits, manifolds or headers.

The actively-controlled poppet valves, which may be referred to as actively-controlled poppet valve assemblies, may each include a stem element secured to a disk element that is seatable within the head or a disk element that is seatable within a separate valve seat inserted within the head. The stem element may be connected to an actuating mechanism, such as electro-hydraulic or electro-pneumatic actuating mechanisms, which is configured to have the respective valve impart linear motion to the respective stem element. As may be appreciated, the actuating mechanism may be operated independently for different steps in the process to activate a single valve or a single actuating mechanism may be utilized to control two or more valves. As an example, opening an actively-controlled poppet valve may include linearly moving with a actuating mechanism at least one valve stem to provide an opening between a disk element coupled to the at least one valve stem and a seat secured to the housing of the adsorbent bed unit. The linear movement, which may be along a straight path, may be proportional or may not be proportional for different configurations. As another example, opening actively-controlled poppet valves may include linearly moving a lift plate secured to the valve stems with an actuating mechanism to provide openings, wherein each of the valve stems is secured to a disk element and each of the openings forms a gap or flow path between the disk element and an associated seat secured to the housing of the adsorbent bed unit.

The passively-controlled valve may include passively-controlled poppet valves, passively-controlled check valves, passively-controlled reed valves, and other suitable passively-controlled valves. For example, the passively-controlled poppet valves, which may be referred to as passively-controlled poppet valve assemblies, may each include a stem element secured to a disk element that is seatable within the head or a disk element that is seatable within a separate valve seat inserted within the head. The stem element may be connected to a biasing mechanism, such as a spring or other biasing mechanisms, which is configured to have the respective valve impart linear motion to the respective stem element. As may be appreciated, the biasing mechanism may be operated independently for different steps in the process and may be activated based on a pressure differential to activate a single valve or two or more valves. One configuration of a passively-controlled poppet valve may include a spring-loaded passively-controlled poppet valve. In this spring-loaded configuration, the disk element may be an integral component with a hollow stem element, which has the springs disposed at least partially within the hollow stem element. As an example, the opening of passively-controlled poppet valves may include linearly moving with a product biasing mechanism at least one product valve stem to provide a product opening between a product disk element coupled to the at least one product valve stem and a product seat secured to the housing of the adsorbent bed unit. The product biasing mechanism may be configured to move linearly based on a pressure differential between the interior region and the product conduit exceeding a specific threshold. In other configurations, the linear movement based on the pressure differential may be different for various valves operating in phase. For example, the passively-controlled valves operating in phase may involve a range or a differential window of less than 25%, less than 20% or less than 10% (e.g., differential window may be calculated as the highest pressure differential minus the lowest pressure differential with that difference being divided by the highest pressure differential). As another example, a passively-controlled valve may also be configured as a reed-valve comprised of a flexible strip of metal or composite material anchored on one end and bending to open the passively controlled flow area. The passively-controlled reed valve may be utilized to provide more flow at a given differential pressure in a given footprint.

The configuration of the passively-controlled valves and/or actively-controlled poppet valves may operate differently for the different streams. For example, the opening of the passively-controlled valves and/or actively-controlled poppet valves may involve moving a feed disk element away from the adsorbent bed to form a gap between the disk element and the seat. The configuration may involve applying pressure on the disk element for each of the one or more passively-controlled valves from a pressure differential between the interior region and the respective conduit to hinder leakage from the one or more passively-controlled valves during the performing one or more steps. As an example, the feed poppet valves may move away from the adsorbent bed and utilize the pressure within the feed conduit to maintain the valve in the respective feed seat.

Further, sets of the passively-controlled valves and/or actively-controlled poppet valves may operate in phase for a swing adsorption process. By way of example, the swing adsorption process cycle may involve two or more steps that each has a certain time interval, which are summed together to be the cycle time. These steps include a regeneration step following an adsorption step and may use a variety of method in the steps including pressure swing, vacuum swing, temperature swing, purging (via any suitable type of purge fluid for the process), and combinations thereof. As an example, a swing adsorption process may include a cycle that involves the one or more steps, such as adsorption, depressurization, purging, and re-pressurization. When performing the separation at high pressure, depressurization and re-pressurization (which may be referred to as equalization steps) are performed in multiple steps to reduce the pressure change for each step and enhance efficiency. In some swing adsorption processes, such as rapid cycle swing adsorption processes, a substantial portion of the total cycle time is involved in the regeneration of the adsorbent bed. The present techniques may involve combining at least one passively-controlled valve with at least one actively-controlled poppet valve for one or more of the swing adsorption steps in the cycle. As an example, the feed or adsorption step may include an actively-controlled poppet valve on the feed inlet side of the adsorbent bed unit and a passively-controlled valve on the product vent side of the adsorbent bed unit, which may be a poppet valve, check valve or reed valve. As another example, the purge step may include an actively-controlled poppet valve on the purge vent side of the adsorbent bed unit and a passively-controlled valve on the purge inlet side of the adsorbent bed unit.

In one or more embodiments, the present techniques include a swing adsorption system that includes one or more adsorbent bed units. Each of the one or more adsorbent bed units have a first end and a second end; an adsorbent bed disposed within a housing of the adsorbent bed unit between the first and second ends in an interior region and used to remove at least one gas component from a feed stream; a feed inlet control device comprising at least one actively-actuated feed poppet valve at the first end of the adsorbent bed unit and a feed inlet poppet valve actuation system to open and close the at least one actively-actuated feed poppet valve; a feed control module to control at least two of the a) timing to open the at least one actively-actuated feed poppet valve, b) the opening duration of the at least one actively-actuated feed poppet valve, c) the opening rate of the at least one actively-actuated feed poppet valve and d) the closing rate of the at least one actively-actuated feed poppet valve; a purge vent control device comprising at least one actively-actuated purge poppet valve at the first end of the adsorptive vessel; a purge vent poppet valve actuation system to open and close the at least one actively-actuated purge poppet valve; a purge control module to control at least two of the a) timing to open the at least one actively-actuated purge poppet valve, b) the opening duration of the at least one actively-actuated purge poppet valve, c) the opening rate of the at least one actively-actuated purge poppet valve and d) the closing rate of the at least one actively-actuated purge poppet valve; a product vent control device comprising at least one passively-actuated product valve at the second end of the adsorptive vessel in which the difference between the pressure within the interior region and a product vent conduit controls the opening or closing of the at least one passively-actuated product valve; and a purge feed control device comprising at least one passively-actuated purge valve at the second end of the adsorbent bed unit in which the difference between the pressure within the interior region and the purge conduit controls the opening or closing of the at least one passively-actuated product purge valve.

In other embodiments, the swing adsorption system may include various enhancements. For example, the at least one actively-actuated feed poppet valve may be a reverse acting poppet valve, which may also include a plurality of actively-actuated feed poppet valves and/or combination of one or more actively-actuated feed poppet valve and/or one or more passively-actuated product vent valve. Further, the at least one actively-actuated purge poppet valve may be a forward-type poppet valve. The actively-actuated feed poppet valve and/or actively-actuated purge poppet valve may also include a common actuation system, which may incorporate a lift plate or in which the individual actively-actuated feed poppet valves may have various dimensions of valve lash to facilitate the sequential opening of actively-actuated feed poppet valves. In addition, the passively-actuated product poppet valve and/or passively-actuated purge poppet valve, may incorporate a spring-like device configured to hold the respective poppet valve closed, and to open the respective poppet valve at a desired pressure differential. Moreover, the feed control module and/or the purge control module may include a processor, memory and a set of instructions stored in memory and may be configured to perform numerical calculations that determine the opening sequence, opening time, opening rate and/or closing rate of the respective actively-actuated poppet valves, such as the actively-actuated feed poppet valve and/or actively-actuated purge poppet valve, for example.

Further still, in other embodiments, the swing adsorption system may include additional enhancements. For example, the system may include a computer controlled electro-hydraulic actuators with air/gas springs for the poppet valves; may use one or more of reverse acting poppet valves for the feed poppet valves and/or forward acting poppet valves; may use preferred multiples of the feed valves; and/or may use process streams to actuate the poppet valves (e.g., passively-controlled poppet valves). As another example, the system may use an annular actuator piston to guide a lift plate associated with the poppet valves; use two or more lift stops on the annular piston associated with the poppet valves; use tapered dampers on the lift stops associated with the poppet valves; use selected lash adjustments to open one or more poppet valves before the other poppet valves open to adjust the flow profile. Moreover, as yet another example, the system may include disposing the passively-actuated valve on the bottom of the adsorbent bed unit and the actively-actuated poppet valve (e.g., having associated actuating mechanisms) on the top of the adsorbent bed unit; disposing the actuating mechanism for one or more of the actively-actuated poppet valves within a hermetically sealed compartment or the adsorbent bed unit to limit external leakage from process flanges; and/or using radial or circumferential partitioning of the adsorbent bed unit's heads to increase the number of connections for the flow streams served by various sets of poppet valves.

The present techniques may involve using two or more adsorbent beds, which are operated on a similar cycle that are performing different steps of the cycles (e.g., not synchronized with each other) to maintain a steady flow of fluids for the various streams (e.g., feed stream, product stream, heating stream, and purge stream).

Further, in other embodiments, the pressure of the different streams may be varied. For example, the feed stream may involve a feed pressure that ranges range between 50 bar absolute (bara) and 150 bara, between 40 bara and 150 bara, or preferably between 50 bara and 100 bara, but is not necessarily limited to this range. The feed temperature may be in the range between 0° F. and 200° F., in the range between 20° F. and 175° F. or in the range between 40° F. and 150° F. The blowdown pressure, heating pressure, and purge pressure may be adjusted depending on the cycle, may depend upon the adsorbent material being utilized and/or may range from vacuum to feed pressure. For example, if the adsorbent material is zeolite 4A, the blowdown pressure range may be between 0.01 bara to 40 bara, or more preferably in a range between 1 bara and 30 bara. This example may depend on the feed concentration of contaminants, such as $CO_2$ and/or water. Also, in other embodiments, the depressurization steps may be adjusted such that the pressure swing is achieved in stages to vary the amount of methane desorbing during each step, if any.

In yet other embodiments, the present techniques may be integrated with other processes, such as liquefied natural gas (LNG) applications, control freeze zone (CFZ) applications, Natural Gas Liquid (NGL) recovery applications, and other such applications such as de-hydration. Each of these different applications may include different specifications for the feed stream in the respective process. For example, variants of the present techniques may be used to treat gases containing higher or lower amounts of $CO_2$ as compared to LNG specifications or pipeline specifications.

In one or more embodiments, the present techniques can be used for any type of swing adsorption process. Non-limiting swing adsorption processes for which the present techniques may be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes. For example, the preferred swing adsorption process may include a pressure swing adsorption, but may also involve a combination of pressure and temperature swing adsorption, which may be performed as a rapid cycle process. Exemplary swing adsorption processes are further described in U.S. Patent Application Publication Nos. 2008/0282892, 2008/0282887, 2008/0282886, 2008/0282885, 2008/0282884 and 2014/0013955, which are each herein incorporated by reference in their entirety.

Further still, in one or more embodiments, a variety of adsorbent materials may be used to provide the mechanism for the separations. Examples include zeolite 3A, 4A, 5A, ZK4 and MOF-74. However, the process is not limited to these adsorbent materials, and others may be used as well.

Beneficially, the present techniques provide various enhancements over conventional techniques. For example, by utilizing passively-actuated valves, the adsorbent bed unit may lessen the weight and footprint needed for operating the adsorbent bed unit. Further, the present techniques may provide a modular design, which may be configured to lessen the footprint, lessen the weight of the adsorbent bed unit, and capital expense of the adsorbent bed unit used to treat a feed stream and remove one or more gas contaminants. In addition, the use of the passively-actuated valves on the adsorbent bed unit may provide flexibility in the configuration, which may enhance the maintenance and repair. The present techniques may be further understood with reference to the FIGS. 1 to 7 below.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units, wherein at least one of the adsorbent bed units has one or more passively-controlled poppet valves and one or more actively-controlled poppet valves to manage the flow of fluids through the adsorbent bed unit, which may be operated in phase.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow to, from or between components. The adsorbent bed within an adsorbent bed unit may separate one or more contaminants from the feed stream to form a product stream. As may be appreciated, the adsorbent bed units may include other conduits to control other fluid streams as part of the process, such as purge streams, depressurizations streams (e.g., blow-down streams), and the like. In certain configurations, the adsorbent bed units may also include a heating loop (not shown), which is used to enhance the removal of contaminants from the adsorbent bed. Further, the adsorbent bed unit may also include one or more equalization vessels, such as equalization vessel 108, which are dedicated to the adsorbent bed unit and may be dedicated to one or more steps in the swing adsorption process.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves, such as passively-controlled poppet valves and/or actively-controlled poppet valves along with reverse acting poppet valves and/or forward acting poppet valves. The reverse acting poppet valves opens away from the adsorbent bed, while the forward acting poppet valve opens toward the adsorbent bed. As an example, the adsorbent bed unit may include one or more poppet valves, each in flow communication with a different conduit associated with different streams. The poppet valves may provide fluid communication between the adsorbent bed and one of the respective conduits, manifolds or headers.

The adsorbent bed comprises a solid adsorbent material capable of adsorbing one or more gas components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
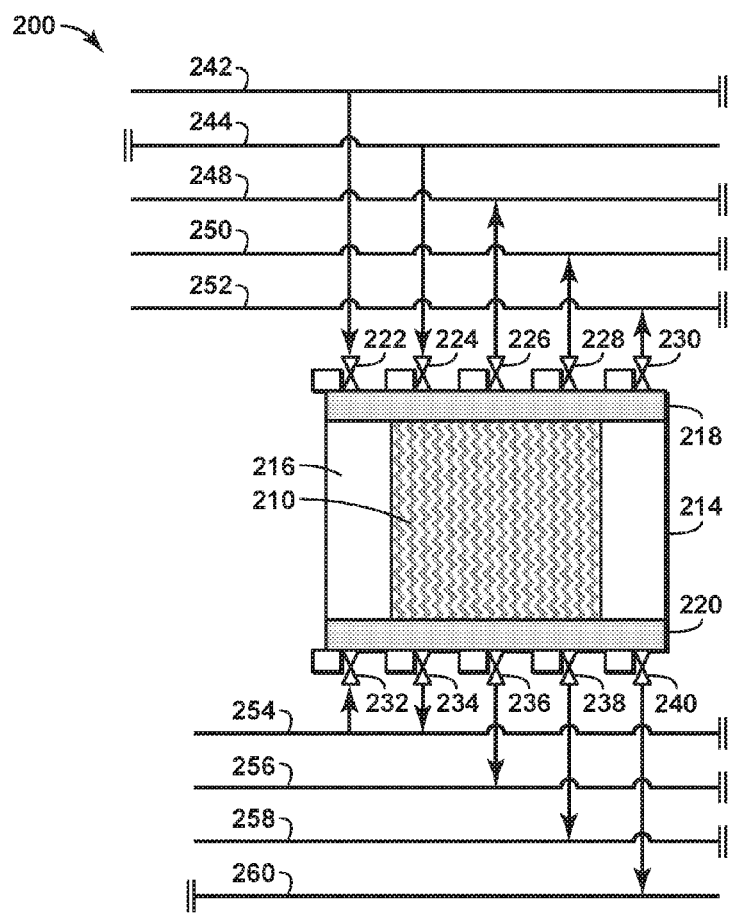
FIG. 2 is a diagram of a portion of an adsorbent bed unit having associated valve assemblies and manifolds in accordance with an embodiment of the present techniques.

FIG. 2 is a diagram of a portion of an adsorbent bed unit 200 having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure from 0 bara (bar absolute) to 150 bara within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. Further, the respective disk elements may be adjacent to the adsorbent bed 210, which may lessen the dead volume in the interior region. The stem element may be connected to an actuating mechanism or a biasing mechanism, which is configured to have the respective valve impart linear motion to the respective stem. As may be appreciated, the actuating mechanism or a biasing mechanism, which are used for the different poppet valve types, may be operated independently for different steps in the process to activate a single valve or to activate two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In swing adsorption processes, the cycle involves two or more steps that each has a certain time interval, which are summed together to be the cycle time or cycle duration. These steps include regeneration of the adsorbent bed following the adsorption step using a variety of methods including pressure swing, vacuum swing, temperature swing, purging (via any suitable type of purge fluid for the process), and combinations thereof. As an example, a PSA cycle may include the steps of adsorption, depressurization, purging, and re-pressurization. When performing the separation at high pressure, depressurization and re-pressurization (which may be referred to as equalization) may be performed in multiple steps to reduce the pressure change for each step and enhance efficiency.

To manage the flow of fluids, the present techniques include a swing adsorption system that includes one or more passively-controlled poppet valves and one or more actively-controlled poppet valves in the adsorbent bed unit 200. As an example, the passively-controlled poppet valves and the actively-controlled poppet valves may be paired together for each stream to operate in phase with each other. By way of example, the inlet poppet valves, such as valve assemblies 222, 224 and 232, may be more actively-controlled poppet valves, while the valves assemblies 226, 228, 230, 234, 236, 238 and 240, may be passively-controlled poppet valves. In this configuration, each of the respective actively-controlled poppet valves may be used to control the stream being provided to the adsorbent bed 210 within the interior region, and each of the respective passively-controlled poppet valves may be activated based on the respective actively-controlled poppet valve. In this manner, the actively-controlled poppet valve may be used to adjust the operating conditions, such as the pressure or temperature, within the interior region to operate with or operate in phase with one or more of the passively-controlled poppet valves. The actively-controlled poppet valves and/or passively-controlled poppet valves may provide fluid communication between the adsorbent bed and one of the respective conduits, manifolds or headers.

The placement of the poppet valves for the adsorbent bed unit has certain constraints that limit the configurations. For example, the diameter of the head of the adsorbent bed unit is limited by the diameter of the adsorbent bed to avoid excessive dead volume in the interior region outside of the volume of the adsorbent bed itself. As a result, multiple feed inlet poppet valves may be used to maximize the flow area available on the head of the adsorbent bed unit. For example, in certain configurations, the number of feed inlet poppet valves may be 5, 6, 7 or 9 disposed on a single pitch circle around a single purge vent valve. Other configurations may include 12 or 18 disposed in two circles.

Figure 3:
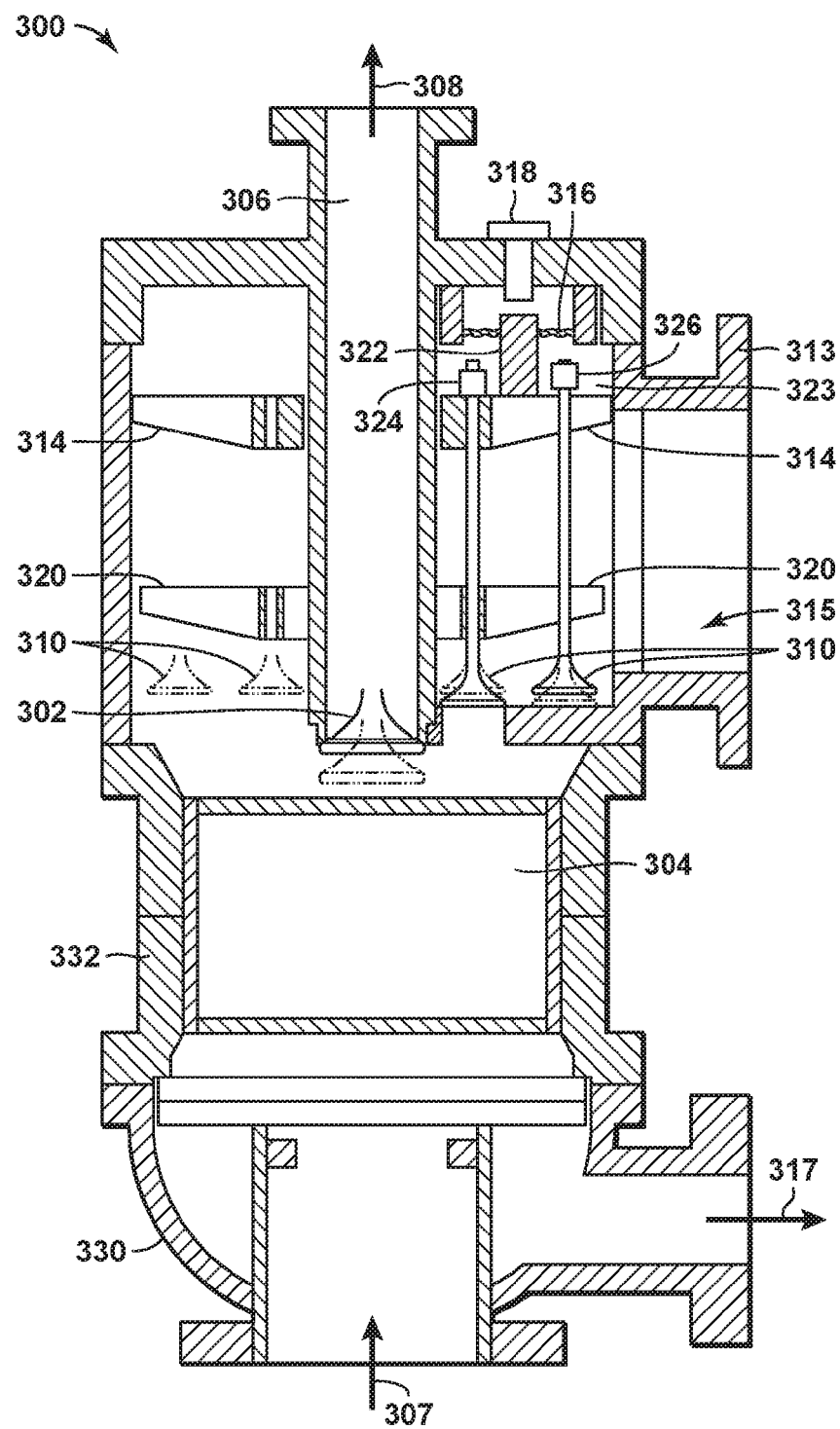
FIG. 3 is a cross sectional diagram of an exemplary adsorbent bed unit with a poppet valve configuration in accordance with an embodiment of the present techniques.

As an example configuration of an adsorbent bed unit, FIG. 3 is a cross sectional diagram 300 of an adsorbent bed unit with a poppet valve configuration in accordance with an embodiment of the present techniques. In this diagram 300, various actively-controlled poppet valves, such as purge vent poppet valve 302 and feed inlet poppet valves 310, are disposed in a first head 313, while various passively-controlled poppet valves (not shown) are disposed on a second head 330. A body portion 332 is disposed between the two heads 313 and 330 and surrounds the adsorbent bed 304.

The purge vent poppet valve 302 is a single actively-controlled poppet valve mounted on the centerline of the adsorbent bed unit. The purge vent poppet valve 302 opens toward the adsorbent bed 304, in the forward acting direction. The actuator (not shown) may be mounted above the purge vent poppet valve 302 and may be an electro-hydraulic actuator, which uses pressurized air ("air spring") behind a piston to provide the closing force. The type of forward acting poppet valve may be utilized with the feed pressure during the adsorption step to assist the air spring in closing and maintaining the purge vent poppet valve 302 closed against leakage into the purge vent conduit 306 and purge vent header (not shown). The purge stream may enter the adsorbent bed 304, as shown by arrow 307, and be conducted away as the purge output stream in the direction indicated by arrow 308 to be conducted away from the adsorbent bed 304.

In addition, the diagram 300 has multiple feed inlet poppet valves 310, which are each actively-controlled poppet valves. The multiple feed inlet poppet valves 310 manage the flow of the feed stream, as shown by the arrow 315, which is provided from a feed conduit (not shown) that may be coupled to a portion of the head 313. The feed stream is passed to the adsorbent bed 304 and is conducted away as a product stream as shown by arrow 317. The feed inlet poppet valves 310 may be configured to opening away from the adsorbent bed 304 in a reverse acting poppet valve. The use of multiple feed inlet poppet valves 310 may maximize the flow area available on the head 313 of the adsorbent bed unit. The feed inlet poppet valves 310 are lifted by the annular shaped element, which is referred to as a lift plate 314. The lift plate 314 is guided by an annular actuator piston, which is referred to as a flexible metal diaphragm piston 316. Alternately, a rigid annular piston with sliding hydraulic seals may also be used. The total lift is set by lift stops, such as lift stop 318, which constrain the annular piston to a plane parallel to the head to provide the same lift when open for each of the feed inlet poppet valves 310. The lift stops can employ a tapered metal plug (not shown) entering a cylindrical recess (not shown) in the annular piston to dampen the motion of the lift plate as it approaches the lift stops. The feed inlet poppet valves 310 are guided through bushings in a stationary guide plate 320 to ensure the disk elements seat properly. For closing accelerations of less than one gravity (e.g., 9.8 meters per second squared), the feed inlet poppet valves 310 may be employed without springs if the adsorbent bed's cylinder axis is vertical. The feed inlet poppet valves 310 may be held in firm seating contact by pressure (e.g., pressure differentials) to seal during the purge step. Further, a valve lash, such as valve lashes 322 and 323, is the distance between the lift plate 314 and the jam nuts 324 and 326. The valve lash 322 may be adjusted to provide preferential opening of one or more feed inlet poppet valves 310 before the remainder of the poppets actuated by the lift plate 314. For example, the valve lash 322 may be 1 millimeter in length, while the valve lash 323 may be 10 millimeters in length. In this manner, the feed inlet poppet valve 310 associated with the valve lash 322 may open prior to the feed inlet poppet valve 310 associated with the valve lash 323.

As an example, the present techniques may involve a swing adsorption cycle that involves an adsorption step and a purge step. For this example, the adsorbent bed unit may include four streams, which are a feed stream provided by feed inlet (e.g., the feed inlet poppet valve 310), a product stream provided via a product vent (e.g., product vent poppet valves), a purge stream provided by a purge inlet (e.g., purge inlet poppet valve) and a purge output stream provided via a purge vent (e.g., purge vent poppet valve 302). The inlets and vents may each be associated with the respective poppet valves that are coupled to specific conduit (e.g., a manifold or other tubular members) for that stream. In addition, the opening actively-controlled feed poppet valves may also include using different valve lashes to provide a first flow path for the gaseous feed stream through a first opening prior to providing a second flow path through a second opening. An exemplary swing adsorption cycle is shown in FIG. 4.

Figure 4:
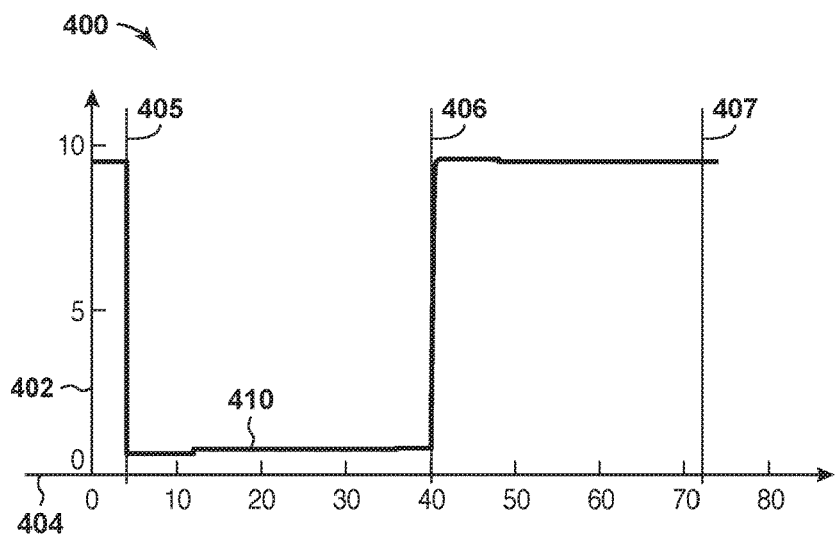
FIG. 4 is an exemplary diagram of the pressure within the adsorbent bed unit for the configuration in FIG. 3 in accordance with an embodiment of the present techniques.

FIG. 4 is an exemplary diagram 400 of the pressure within the adsorbent bed unit for the configuration in FIG. 3 in accordance with an embodiment of the present techniques. In this diagram 400, a pressure response 410 is shown along a pressure axis 402 in mega Pascals (MPa) with respect to a time axis 404 in seconds (s). In this diagram 400, the pressure response 410 shows the pressure changes within the interior region of the adsorbent bed unit for different steps in the cycle. The exemplary cycle for the adsorbent bed unit may include performing an adsorption step and a regeneration step, with the regeneration step including a purge step. The purge step may be used to remove the moisture from the adsorbent bed 304. The feed stream is a natural gas stream with moisture that is provided at 8.1 MPa, which may be provided from the feed inlet poppet valves 310. In particular, ending of a previous adsorption step is shown from the time period from zero seconds to four seconds (e.g., indicated by the step marker 405).

The purge step is performed during the time period from four seconds to forty seconds, which is from the step marker 405 to the step marker 406. During the purge step, as shown on the pressure response 410, the pressure within the interior region of the adsorbent bed unit decreases from 8.1 MPa to 2.9 MPa. The purge vent poppet valve 302 opens at 4 seconds and closes at 36 seconds. Then, the purge feed poppet valve opens and closes at the same time as the purge vent poppet valve 302. During the purge step, the feed inlet poppet valves 310 are closed and the purge vent poppet valve is opened. The pressure within the interior region is lower than the pressure within the feed conduit, which provides additional support for maintaining the disk elements (e.g., feed disk elements) of the feed inlet poppet valves 310 in the respective seats to seal any flow paths through those poppet valves.

Following the purge step, an adsorption step is performed during the time period from forty seconds to seventy-two seconds, which is from the step marker 406 to the step marker 407. The adsorption step, as shown on the pressure response 410, increases the pressure from 2.9 MPa to 8.1 MPa as part of this step. During the adsorption step, the feed inlet poppet valves 310 are opened and the purge vent poppet valve is closed. The pressure within the interior region is higher than the pressure within the purge conduit, which provides additional support for maintaining the disk element (e.g., purge vent disk element) of the purge vent poppet valve 302 in the respective seat to seal any flow paths through those poppet valves. As a result, the feed pressure during adsorption step assists the air spring in closing the purge vent poppet valve against leakage into the purge vent head.

As may be appreciated, the dimensions for the proper flow areas for an adsorbent bed unit may be adjusted for different treating operations. For example, the dimensions may be adjusted for the type of treating process, such as dehydration, the process conditions, such as the feed rate of the various streams, pressures for the streams and/or step being performed, and/or temperature of the stream.

Figure 5:
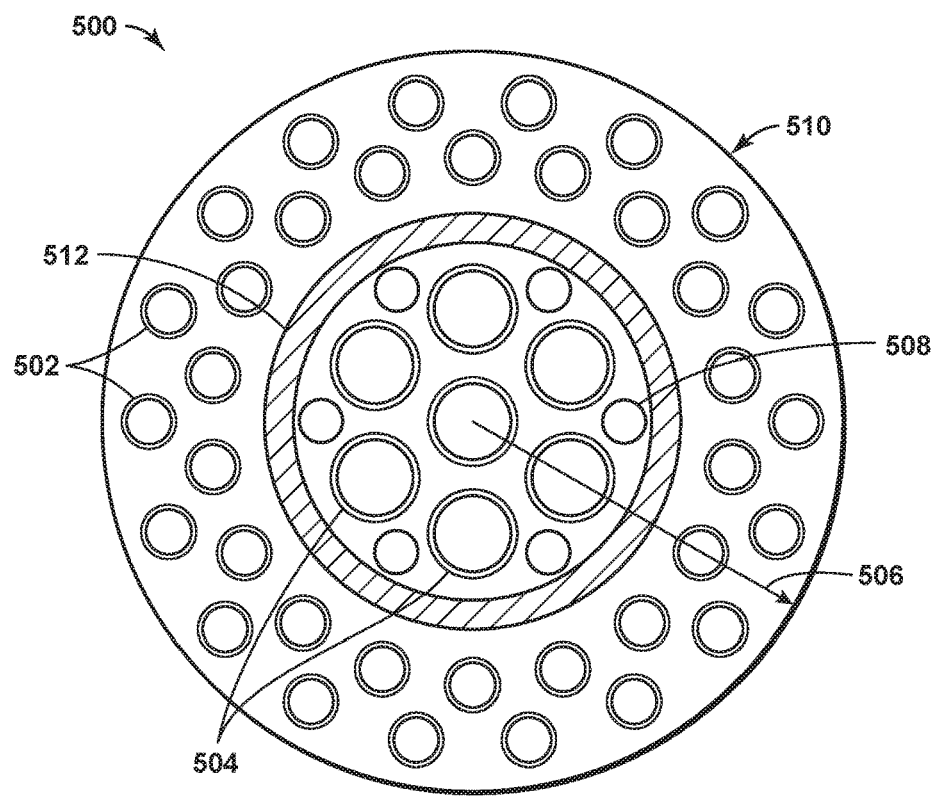
FIG. 5 is a cross sectional diagram of an exemplary head for an adsorbent bed unit from a product vent end in accordance with an embodiment of the present techniques.

FIG. 5 is a cross sectional diagram 500 of an exemplary head for an adsorbent bed unit from a product vent end in accordance with an embodiment of the present techniques. In this diagram 500, the two separate connections are shown for the product stream and purge feed stream. The head 510 includes various poppet valves, such as product vent poppet valves 502 and the purge feed poppet valves 504, which are positioned on a head 510. The product vent poppet valves, such as product vent poppet valves 502, are positioned on the outer portion of the head 510, while the purge feed poppet valves, such as purge feed poppet valves 504, are positioned on the inner portion of the head 510. The inner portion and the outer portion of the head are separated by a sealing element 512. The head 510 has a substantially circular shape with a radius 506. The header 510 also includes various cap screws (e.g., six cap screws), such as cap screw 508.

In this configuration, the feed inlet poppet valves (not shown) and the purge vent poppet valves (not shown), which are disposed on the feed end of the adsorbent bed unit, may be actively-actuated poppet valve, which may include computer-controlled electro-hydraulic actuators. Because the pressure balance in the interior region of the adsorbent bed unit may be controlled by the feed inlet poppet valves and the purge vent poppet valves, the product vent poppet valves 502 and the purge feed poppet valves 504 may be passively-actuated poppet valves. The product vent poppet valves 502 and the purge feed poppet valves 504 may be configured to open and to close in proper sequence based on the pressure difference across the respective poppet valves.

The purge feed poppet valves and the product vent poppet valves may be mounted in a two-piece valve body, as used on the cylinder valves of reciprocating compressors in process gas service. The two separate connections may also be sealed at the two-piece valve body by a gasket clamped against the valve body. Sealing at this joint prevents leakage of the product stream into the purge conduit, which may lessen any loss of the product stream. However, leakage at this joint may not cause loss of containment. The number of the purge feed poppet valves may follow the same preferred configurations, as noted above for the feed inlet poppet valves.

Beneficially, the automatic opening of these poppet valves lessens the bulk and cost of the adsorbent bed unit by eliminating the separate actuators for these poppet valves. Further, the orientation of the adsorbent bed unit may position the passively-actuated poppet valves on the bottom of the adsorbent bed unit to limit the height of the adsorbent bed unit's supports above ground level, and to lessen maintenance issues. In an alternative configuration, the orientation of the adsorbent bed unit may position the passively-actuated poppet valves on the top of the adsorbent bed unit to limit the conduits and equipment at the higher elevation.

In certain embodiments, poppet valves may be installed in a reciprocating compressor valve body. The poppet valves may be fabricated from a fiber reinforced thermoplastic material, with corrosion resistant coil springs to ensure closure. Other types of passively-actuated valves, such as reed valves, check valves or plate valves as used in reciprocating compressors may also be employed.

For an exemplary head on the feed inlet end of the adsorbent bed unit, which may be used with the head 313 of FIG. 3, two separate connections may be provided, which include the feed stream and the purge output stream. For this feed inlet head configuration, the head may include various poppet valves positioned on the head, such as feed inlet poppet valves and the purge vent poppet valve. For example, as noted above for FIG. 3, the purge vent poppet valve may be positioned in the center of the head, while the feed inlet poppet valves may be disposed around the outer portion of the head. Each of the feed inlet poppet valves and the purge vent poppet valve may include one or more respective actuating mechanisms to operate the actively-controlled poppet valves. The feed actuators may operate as described above. In addition, the head or a sealing element may be used to isolate the purge vent stream from the feed stream in different compartments of the head.

To accommodate more streams, the head on the feed inlet end may be partitioned into various compartments. For example, the rapid cycle swing adsorption processes may involve more than the four connections to process a feed stream. Accordingly, the head on the feed inlet end of the adsorbent bed unit may be partitioned or compartmentalized to provide access for the different streams. By way of example, FIGS. 6A and 6B shows radial partitioning to provide stream connections for a head, while FIG. 7 shows circumferential partitioning to provide two connections for a head.

Figure 6A:
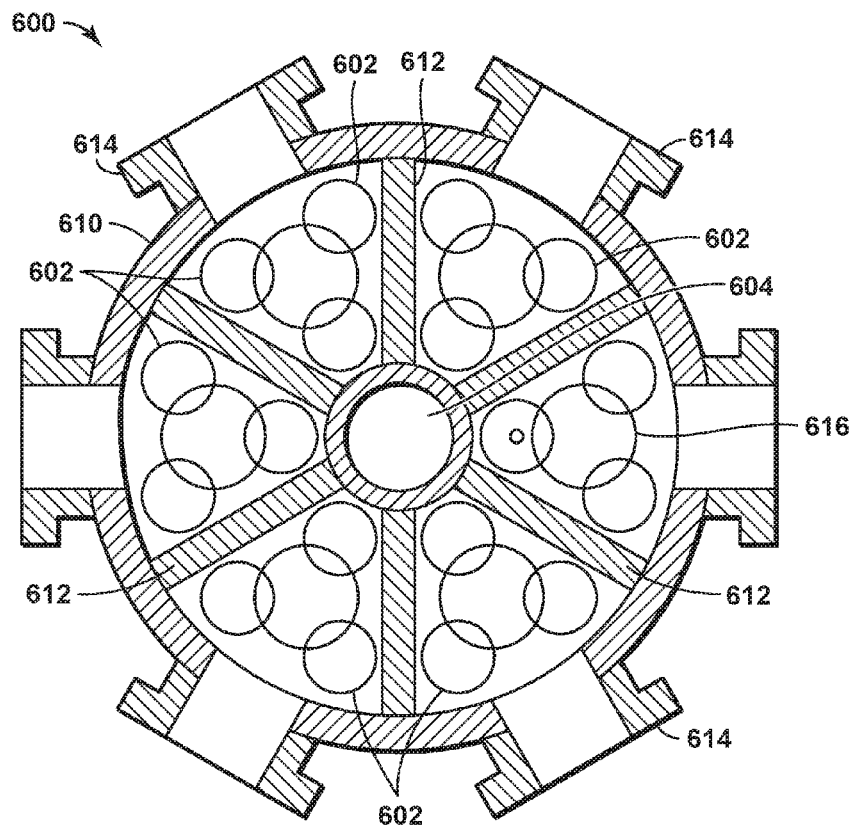
FIGS. 6A and 6B are exemplary cross sectional diagrams of an exemplary head for an adsorbent bed unit in accordance with an embodiment of the present techniques.
Figure 6B:
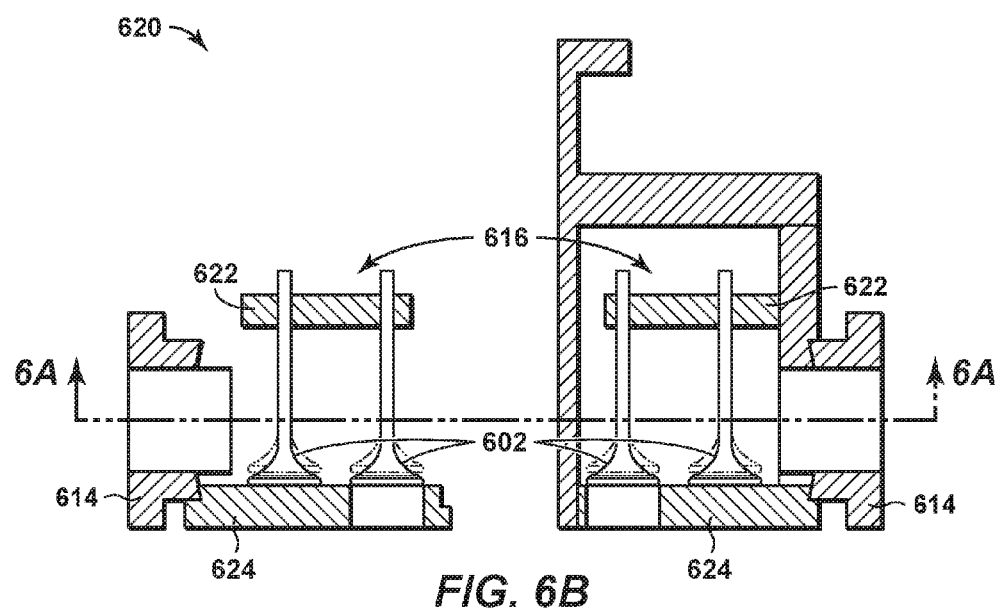
Figure 7:
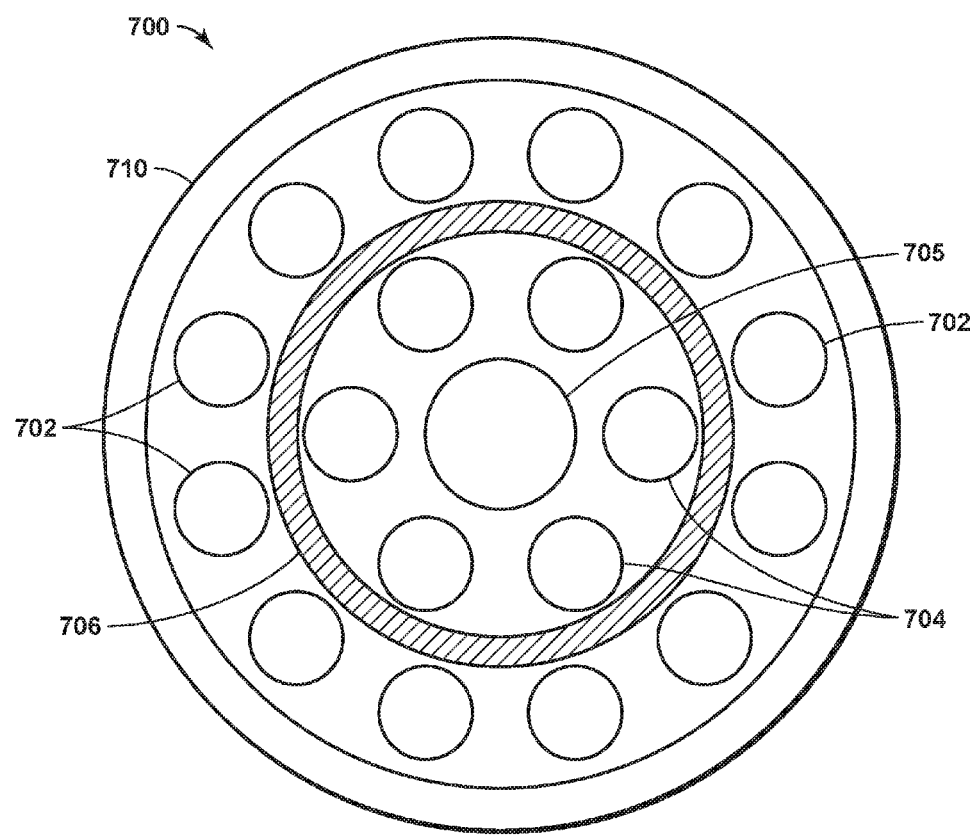
FIG. 7 is an exemplary cross sectional diagram of another exemplary head for an adsorbent bed unit in accordance with an embodiment of the present techniques.

FIGS. 6A and 6B are diagrams 600 and 620 from an exemplary head for an adsorbent bed unit in accordance with an embodiment of the present techniques. Diagram 600 is a cross sectional view of a head having separate connections for the various streams, which may include feed streams, depressurizing stream, product stream, purge stream and purge output streams. In particular, the head 610 is divided into seven different compartments, which are partitioned by radially extending structural elements 612 from a center circular structural element that forms a center port 604. Accordingly, various poppet valves, such as poppet valves 602, may be distributed within the different compartments along with an actuating mechanism, such as actuator 616, to control the flow of fluids through the respective poppet valves in the different compartments.

For example, the head may be positioned on a feed inlet end for an adsorbent bed unit. The head 610 includes various poppet valves positioned on the head 610, such as poppet valves 602, which may be feed inlet poppet valves. Further, the center port 604 may be used as a purge vent portion of the head 610, which is in fluid communication with the purge vent conduit (not shown). The purge vent poppet valve (not shown) is in fluid communication with the center port 604 and secured to the head 610. The poppet valves, such as poppet valves 602, are positioned within different compartments formed by the structural elements or walls 612 of the head 610. The different compartments may be used to separate and to isolate flow from different conduits through the respective inlet ports, such as inlet port portions 614 of the head 610. The head 610 has a substantially circular shape, which provides the substantially triangular shaped compartments. In addition, the actuating mechanism, such as actuator 616, are superimposed on this diagram 600 to show that one actuator is associated with three of the poppet valves. The actuators may operate as described above.

In diagram 620, the inlet port portions 614 of the head 610 is shown providing access to poppet valves 602. The lift plate 622 is guided by the actuator 616 to open and to close the poppet valves 602, which seat within portion of the head 624. The cross sectional line 6A shows the relationship between the diagram 600 in FIG. 6A and the diagram 620 in FIG. 6B, where diagram 600 is the cross sectional view from diagram 620 along the cross sectional line 6A.

As an alternative embodiment, FIG. 7 is a cross sectional diagram 700 from another exemplary head for an adsorbent bed unit in accordance with an embodiment of the present techniques. In the diagram 700, the separate connections, such as the feed stream and purge output stream, are shown for a head 710 that has circular structural element 706. The circular structural element 706 may be used to divide the head into two compartments, which have different poppet valves disposed in the different compartments. For example, poppet valves 702 may be disposed in an outer compartment, while poppet valves 704 may be disposed in the inner compartment.

As an example, the head 710 may be positioned on a feed inlet end for an adsorbent bed unit. In such a configuration, the poppet valves 702 may be feed inlet poppet valves, while the poppet valves 705 may be the purge vent poppet valve and the poppet valves 704 may be blowdown poppet valves. The purge vent poppet valve 705 may be in fluid communication with the purge vent conduit (not shown) and secured to the head 710, while the feed inlet poppet valves 702 is in fluid communication with the feed inlet conduit (not shown) and secured to the head 710. Similarly, the blowdown poppet valves 704 may be in fluid communication with the blowdown conduit (not shown) and secured to the head 710. The structural element or wall 706 of the head 710 may be used to isolate the feed stream from the purge output stream and the blowdown stream. The different compartments may be used to separate and to isolate flow from different conduits, such as the feed inlet conduit and the purge vent conduit. The head 710 and the structural element 706 have a substantially circular shape. In addition, the actuators, such as feed actuator (not shown) and purge vent actuators, may be utilized to operate the actively controlled poppet valves, such as the feed inlet poppet valves 702 and the purge vent poppet valve 705. The feed actuators may operate as described above.

In one or more embodiments, the present techniques provide a unique combination of rapid cycle temperature and/or pressure swing adsorption to provide the necessary separation of gas components from a feed stream. For example, in an adsorption or feed step, pipeline quality feed gas may be introduced as a feed stream into an adsorbent bed containing an adsorbent material chosen to preferentially adsorb $CO_2$. Then, the gas stream exiting the adsorbent bed, which is the product stream, is at LNG specification (e.g., containing less than 50 ppm of $CO_2$). As the adsorbent bed nears saturation, the feed stream is interrupted and diverted to a different adsorbent bed, and the current adsorbent bed is regenerated in a regeneration step. The regeneration step may include one or more depressurization steps, such as one or more purge steps and/or one or more blowdown steps, where the pressure within the housing of the adsorbent bed is reduced for each subsequent step. The regenerations step results in desorption of some of the methane gas that co-adsorbed with $CO_2$ during the adsorption step. The blowdown output stream is typically of high purity and can be compressed to mix with the product stream which is at LNG specifications.

In certain embodiments, the adsorbent bed may be subjected to a heating step at the lower pressure. This heating step represents a combination of partial pressure swing adsorption and temperature swing adsorption to facilitate regeneration of the adsorbent bed. The heating step may be provided in several manners, such as electrical heating of the metal substrate in the adsorbent bed, passing a heating stream through the adsorbent bed and/or convective heating from a hermetically sealed heating fluid. When the heating step is performed at low pressure, the concentration of $CO_2$ in this stream should be lessened, as it distributes over the adsorbent bed. In the certain embodiments, the heating step may involve mixing the outlet purge stream (e.g., the product of the purge stream) with the heating loop stream and then conducting away the combined stream for fuel. Alternatively, the heating loop may be performed at high pressure and temperature with a stream of predominantly $CO_2$. In such configuration, the blowdown step may be performed at atmospheric pressure with the blowdown stream conducted away for fuel (not product), and then the adsorbent bed may be purged. However, the preferred cycle may involve limiting the amount of $CO_2$ in the heating stream (e.g., to less than about 20%).

The heating step may not heat the entire length of the adsorbent bed to minimize any contaminant breakthrough. Because the adsorbent bed is cooled by certain streams and reactions, the temperature differential may provide for an adsorption wave to form at the feed end (e.g., front of the cooled adsorbent bed) and then moves in the feed direction along the adsorbent bed. As the adsorption front is forming in the front of the adsorbent bed (e.g., near the feed end), the remainder of the adsorbent bed is cooled by the feed prior to the adsorption front advancing to that point. This provides a mechanism for the process to produce LNG quality gas in the initial second or so of feed. For example, the heating step may be configured to result in a temperature differential between the feed end and the product end of the adsorbent bed. The temperature differential is the difference in temperatures between a feed end of the adsorbent bed and a product end of the adsorbent bed, which may be calculated by subtracting the temperature at the product end of the adsorbent bed from the temperature at the feed end of the adsorbent bed. The temperatures may be the measured temperatures by a thermocouple or other temperature measurement device. The feed end or feed side is the end of the adsorbent bed that the feed stream initially enters, while the product end is the portion of the adsorbent bed opposite from the feed end and where the feed stream exits the adsorbent bed. The temperature differential may range between 100° F. and 400° F., range between 125° F. and 350° F. or range between 175° F. and 300° F. The temperature differential may be utilized to have the feed stream enter the adsorbent bed from the feed end and remove contaminants (e.g., $CO_2$ and/or water) prior to being exposed to the higher temperature portion of the adsorbent bed. The lower temperature portion of the adsorbent bed may be referred to as the heating feed region, the portion of the adsorbent bed that is at the heating temperature may be referred to as the heating product region and the portion of the adsorbent bed that transitions from the heating feed region to the heating product region (e.g., portion with the heating front that increases between the temperature differential of these regions) may be referred to as the heating front region. These different regions may vary as the heating step is being performed with the end of the heating step being the maximum heating product region and minimal heating feed region. The heating feed region may be a specific portion of the adsorbent bed from the feed end of the adsorbent bed to 2% of the bed length, from the feed end of the adsorbent bed to 5% of the bed length, from the feed end of the adsorbent bed to 10% of the bed length or from the feed end of the adsorbent bed to 20% of the bed length. The heating product region may be a specific portion of the adsorbent bed from the product end of the adsorbent bed to 60% of the bed length, from the product end of the adsorbent bed to 55% of the bed length or from the product end of the adsorbent bed to 50% of the bed length. Further, the heating step may include heating a portion of the adsorbent bed from a product end of the adsorbent bed to be within a certain range around the heating temperature (e.g., 10% of the heating temperature and/or within 5% of the heating temperature). The movement of the cooling front is toward to the product end during the adsorption step and toward the feed end during the heating step.

Furthermore, in certain embodiments, the above process may be used to separate any two or more contaminants from the feed stream (e.g., to treat the feed stream, which may be pipeline quality gas, to LNG specifications). For example, if the feed stream includes additional equipment (e.g., dehydration adsorption unit, such as molecular sieve adsorption unit and/or dehydration adsorbent bed unit) to remove water from the stream and may be integrated with the present techniques to further process the stream. For example, a dehydration process may be performed upstream of the $CO_2$ removal in the adsorbent bed units by dehydration equipment, such as a molecular sieve or a swing adsorption process (e.g., RCPSA and/or RCTSA). In particular, a molecular sieve unit or a first adsorbent bed unit may be used to remove water, while a second adsorbent bed unit may be used to remove $CO_2$. Alternatively, in another configuration, an integrated rapid cycle adsorption system may be utilized to remove multiple contaminants (e.g., water and $CO_2$). Suitable adsorbent material or adsorbent layers may be utilized to provide the dehydration, which may be the same or different from the adsorbent material used to in the removal of other contaminants, such as $CO_2$.

Moreover, the present techniques may include a specific process flow to remove contaminants, such as $CO_2$ and/or water. For example, the process may include an adsorbent step and a regeneration step, which form the cycle. The adsorbent step may include passing a gaseous feed stream at a feed pressure and feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration step. The regeneration step may include one or more blowdown steps, one or more heating steps and one or more purge steps. The depressurization steps, which may be or include a blowdown step, may include reducing the pressure of the adsorbent bed unit by a predetermined amount for each successive depressurization step, which may be a single step and/or multiple steps. The depressurization step may be provided in a forward direction or may preferably be provided in a countercurrent direction (e.g., from the product end of the adsorbent bed to the feed end of the adsorbent bed). The heating step may include passing a heating stream into the adsorbent bed unit, which may be a recycled stream through the heating loop and is used to heat the adsorbent material. For example, the ratio of heating stream (e.g., loop gas) to feed stream (e.g., feed gas) may be based on the type of adsorbent material, the feed concentration of $CO_2$ in the feed stream, and the frequency of the heating of the adsorbent bed. For low feed concentrations of $CO_2$ in the feed stream, the longer duration of adsorbent step may involve less reheating of the adsorbent bed. For example, if the stream has 2% $CO_2$ in the feed stream, then about 50 to 60% of the feed stream may be used in heating stream, while for 0.5% $CO_2$ in the feed stream, then about 15 to 25% of the feed stream may be used in the heating stream.

The heating stream, which may be provided at a heating temperature and heating pressure, may be provided in countercurrent flow relative to the feed stream. The purge step may include passing a purge stream into the adsorbent bed unit, which may be a once through purge step and the purge stream may be provided in countercurrent flow relative to the feed stream. The purge stream may be provided at a purge temperature and purge pressure, which may include the purge temperature and purge pressure being similar to the heating temperature and heating pressure used in the heating step. Then, the cycle may be repeated for additional streams. Additionally, the process may include one or more re-pressurization steps after the purge step and prior to the adsorption step. The one or more re-pressurization steps may be performed, wherein the pressure within the adsorbent bed unit is increased with each re-pressurization step by a predetermined amount with each successive re-pressurization step. The cycle duration may be for a period greater than 1 second and less than 600 seconds, for a period greater than 2 second and less than 180 seconds or for a period greater than 5 second and less than 90 seconds.

In certain embodiments, the system utilizes a combined swing adsorption process, which combines TSA and PSA, for treating of pipeline quality natural gas to remove contaminants for the stream to satisfy LNG specifications. The process utilizes adsorbent bed units (e.g., each having parallel channel adsorbent beds), wherein the adsorbent bed units are partially depressurized and heated using a heating loop at a heating temperature and a purge stream at a purge temperature for thermally assisted partial pressure desorption. Then, the feed stream is used to cool the adsorbent bed during the adsorption step of the cycle. In particular, a rapid cycle swing adsorption process is used to treat natural gas that is at pipeline specifications (e.g., a feed stream of predominately hydrocarbons along with less than or equal to about 2% volume $CO_2$ and/or less than or equal to 4 ppm H2S) to form a stream satisfying the LNG specifications (e.g., less than 50 ppm $CO_2$ and less than about 4 ppm $H_2S$).

In one or more embodiments, the material may include an adsorbent material supported on a non-adsorbent support. The adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups include primary, secondary, tertiary amines and other non protogenic basic groups such as amidines, guanidines and biguanides.

Further, in one or more embodiments, the adsorbent bed unit may include an adsorbent bed that can be used for the separation of a target gas component form a gaseous mixture. The adsorbent bed is usually comprised of an adsorbent material supported on a non-adsorbent support, or contactor. Such adsorbent bed may contain substantially parallel flow channels wherein 20 volume percent, preferably 15 volume percent or less of the open pore volume of the contactor, excluding the flow channels, is in pores greater than about 20 angstroms. A flow channel is taken to be that portion of the adsorbent bed in which gas flows, if a steady state pressure difference is applied between the point or place at which a feed stream enters the adsorbent bed and the point or place at which a product stream leaves the adsorbent bed. In the adsorbent bed, the adsorbent material is incorporated into the wall of the flow channel.

In one or more embodiments, when using RCTSA or RCPSA, the total cycle times are typically less than 600 seconds, preferably less than 180 seconds, more preferably less than 90 seconds, and even more preferably less than 60 seconds.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

Further, one or more embodiments may include methods that are performed by executing one or more sets of instructions to perform modeling enhancements in various steps of the process. For example, the method may include executing one or more sets of instructions to perform comparisons between thresholds current statuses or indications along with transmitting data between modules, components and/or sensors. By way of example, the computer system may be configured to follow a tiered approach to managing hydrocarbon processing. For example, the operation of a plant or facility may include plant control system configured to manage the flow of streams through a plant and to one or more processes treating the streams within the plant. The plant control system may include a process control system for each of the specific processes, a unit control system for each unit within a specific process and a safety system configured to manage the safety of the plant. Within the unit control system, various stream control modules may be used to manage the valves and equipment for specific streams for a unit. By way of example, the unit control system may include a feed control module and/or a purge control module. These modules may include a processor, memory in communication with the processor and a set of instructions stored in memory and accessible by the processor, wherein the set of instructions, when executed, may be configured to perform numerical calculations that determine the opening sequence, opening time, opening rate and/or closing rate of the respective actively-actuated poppet valves, such as the actively-actuated feed poppet valve and/or actively-actuated purge poppet valve, for example.

As an example, a computer system may be utilized and configured to implement process control for the streams being provided to an adsorbent bed unit. The computer system may include a processor; memory in communication with the processor; and a set of instructions stored on the memory and accessible by the processor, wherein the set of instructions, when executed, are configured to: transmit a signal to one or more actively-controlled poppet valves, such as actively-controlled feed poppet valves or actively-controlled purge poppet valves. The transmitted signal may be to open the poppet valve or to close the poppet valve. Specifically, the transmitted signal may be to open the actively-controlled feed poppet valves to pass a gaseous feed stream from a feed inlet conduit to an adsorbent bed disposed in an interior region of a housing of the adsorbent bed unit. Also, the transmitted signal may be to close the actively-controlled feed poppet valves to hinder or prevent the gaseous feed stream from entering the adsorbent bed. As a further example, the transmitted signal may be to open the actively-controlled purge poppet valves to pass a purge output stream from the adsorbent bed to a purge vent conduit. In addition, the transmitted signal may be to close the actively-controlled purge poppet valves to hinder or prevent the stream from exiting the adsorbent bed.

As an example of a computer system that may be used to perform any of the methods disclosed herein. A central processing unit (CPU) is coupled to system bus. The CPU may be any general-purpose CPU, although other types of architectures of CPU (or other components of exemplary system) may be used as long as CPU (and other components of system) supports the inventive operations as described herein. The CPU may execute the various logical instructions according to disclosed aspects and methodologies. For example, the CPU may execute machine-level instructions for performing processing according to aspects and methodologies disclosed herein.

The computer system may also include computer components such as a random access memory (RAM), which may be SRAM, DRAM, SDRAM, or the like. The computer system may also include read-only memory (ROM), which may be PROM, EPROM, EEPROM, or the like. RAM and ROM hold user and system data and programs, as is known in the art. The computer system may also include an input/output (I/O) adapter, a communications adapter, a user interface adapter, and a display adapter. The I/O adapter, the user interface adapter, and/or communications adapter may, in certain aspects and techniques, enable a user to interact with computer system to input information.

The I/O adapter preferably connects a storage device(s), such as one or more of hard drive, compact disc (CD) drive, floppy disk drive, tape drive, etc. to computer system. The storage device(s) may be used when RAM is insufficient for the memory requirements associated with storing data for operations of embodiments of the present techniques. The data storage of the computer system may be used for storing information and/or other data used or generated as disclosed herein. The communications adapter may couple the computer system to a network (not shown), which may enable information to be input to and/or output from system via the network (for example, a wide-area network, a local-area network, a wireless network, any combination of the foregoing). User interface adapter couples user input devices, such as a keyboard, a pointing device, and the like, to computer system. The display adapter is driven by the CPU to control, through a display driver, the display on a display device. Information and/or representations of one or more 2D canvases and one or more 3D windows may be displayed, according to disclosed aspects and methodologies.

The architecture of computer system may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In view of the many possible embodiments to which the principles of the disclosed invention may be applied, it should be recognized that the illustrative embodiments are only preferred examples of the invention and should not be taken as limiting the scope of the invention.

What is claimed is:

1. A process for removing contaminants from a feed stream, the process comprising:
   a) performing one or more adsorption steps in an adsorbent bed unit, wherein each of the one or more adsorption steps comprise: (i) opening one or more actively-controlled feed poppet valves to pass a gaseous feed stream from a feed inlet conduit to an adsorbent bed disposed in an interior region of a housing of the adsorbent bed unit, (ii) exposing the gaseous feed stream to the adsorbent bed to separate one or more contaminants from the gaseous feed stream to form a product stream, and (iii) opening one or more passively-controlled product valves to conduct away the product stream from the interior region in the housing to a product conduit, wherein each of the one or more passively-controlled product valves operate in phase with at least one of the one or more actively-controlled feed poppet valves;
   b) performing one or more depressurization steps, wherein each of the one or more depressurization steps comprise conducting away at least a portion of the one or more contaminants in an output stream; and
   c) repeating the steps a) to b) for at least one additional cycle, wherein cycle duration is for a period greater than 1 second and less than 600 seconds;
   wherein opening the one or more actively-controlled feed poppet valves further comprises linearly moving with a feed actuating mechanism at least one feed valve stem to provide a feed opening between a feed disk element coupled to the at least one feed valve stem and a feed seat that is inserted within a head of the housing of the adsorbent bed unit.

2. The process of claim 1, wherein the opening one or more actively-controlled feed poppet valves further comprise linearly moving a feed lift plate secured to a plurality of feed valve stems with a feed actuating mechanism to provide a plurality of feed openings, wherein each of the plurality of feed valve stems is secured to a feed disk element and each of the plurality of feed openings forms a gap between the feed disk element and an associated feed seat that is inserted within the head of the housing of the adsorbent bed unit.

3. The process of claim 2, wherein opening the one or more actively-controlled feed poppet valves further comprise providing a first feed flow path for the gaseous feed stream through a first feed opening of the plurality of feed openings prior to providing a second feed flow path through a second feed opening of the plurality of feed openings.

4. The process of claim 1, wherein the opening one or more actively-controlled feed poppet valves further comprises moving the feed disk element away from the adsorbent bed to form a gap between the feed disk element and the associated feed seat.

5. The process of claim 1, further comprising applying pressure on the feed disk element for each of the one or more actively-controlled feed poppet valves based on a pressure differential between the feed inlet conduit and the interior region to hinder leakage from the one or more actively-controlled feed poppet valves during the performing one or more depressurization steps.

6. The process of claim 1, wherein opening one or more passively-controlled product valves further comprise linearly moving with a product biasing mechanism at least one product valve stem to provide a product opening between a product disk element coupled to the at least one product valve stem and a product seat secured to the housing of the adsorbent bed unit.

7. The process of claim 6, wherein the product biasing mechanism is configured to move linearly based on a pressure differential between the interior region and the product conduit exceeding a specific threshold.

8. The process of claim 6, wherein the opening one or more passively-controlled product valves further comprises moving the product disk element away from the adsorbent bed to form a gap between the product disk element and the product seat.

9. The process of claim 6, further comprising applying pressure on the product disk element for each of the one or more passively-controlled product valves from a product pressure differential between the interior region and the product conduit to hinder leakage from the one or more passively-controlled product valves during the performing one or more depressurization steps.

10. The process of claim 1, wherein opening one or more passively-controlled product valves further comprise moving a flexible strip to provide a product opening between the flexible strip and a product seat.

11. The process of claim 1, wherein the performing one or more depressurization steps comprises performing one or more purge steps, wherein each of the one or more purge steps comprise passing a purge stream into the adsorbent bed unit to conduct away at least a portion of the one or more contaminants in a purge output stream.

12. The process of claim 11, wherein each of the one or more purge steps comprise: (i) opening one or more actively-controlled purge vent poppet valves to conduct away the purge outlet stream from the adsorbent bed, (ii) exposing the purge stream to the adsorbent bed to separate the at least a portion of the one or more contaminants from the adsorbent bed to form the purge output stream, and (iii) opening one or more passively-controlled purge poppet valves to pass the purge stream to the interior region from a purge conduit.

13. The process of claim 1, wherein the opening one or more passively-controlled product valves is within at least 80% of the time interval for the opening one or more actively-controlled feed poppet valves.

14. The process of claim 1, further comprising performing one or more heating steps after performing the one or more adsorption steps, wherein each of the one or more heating steps comprises passing a heating stream at a heating temperature into the adsorbent bed.

15. The process of claim 1, wherein the gaseous feed stream is a hydrocarbon containing stream having greater than one volume percent hydrocarbons based on the total volume of the feed stream.

16. The process of claim 1, wherein the gaseous feed stream is provided at a feed pressure in the range between 50 bar absolute (bara) and 150 bara and at a feed temperature in the range between 0° F. and 200° F.

17. The process of claim 1, wherein the cycle duration is greater than 2 seconds and less than 180 seconds.

18. A swing adsorption system for removing contaminants from a gaseous feed stream, the system comprising:
an adsorbent bed unit configured to separate contaminants from a gaseous feed stream and to output a product stream in a swing adsorption process, wherein the adsorbent bed unit comprises:
a housing forming an interior region;
an adsorbent bed disposed within the interior region;
one or more actively-controlled poppet valves, wherein each of the one or more actively-controlled poppet valves is configured to provide a first fluid flow passage through an opening in the housing via the actively-controlled poppet valve between the interior region and a first location external to the interior region;
an actuating mechanism coupled to the one or more actively-controlled poppet valves, wherein the actuating mechanism is configured to linearly move at least one active valve stem associated with at least one active disk element for each of the one or more actively-controlled poppet valves to provide an opening between an active disk element coupled to at least one active valve stem and an associated active seat that is inserted within a head of the housing of the adsorbent bed unit;
and
one or more passively-controlled valves, wherein each of the one or more passively-controlled valves is configured to provide a second fluid flow passage through an opening in the housing via the passively-controlled valve between the interior region and a second location external to the interior region and wherein each of the one or more passively-controlled valves operate in phase with at least one of the one or more actively-controlled poppet valves.

19. The swing adsorption system of claim 18, wherein each of the one or more actively-controlled poppet valves are disposed directly adjacent to the adsorbent bed and within the interface cross-sectional area.

20. The swing adsorption system of claim 18, wherein each of the one or more actively-controlled poppet valves comprise an active valve stem coupled to an active disk element; and
further comprising:
a lift plate secured to the active valve stems; and
an actuating mechanism coupled to the lift plate, wherein the actuating mechanism is configured to provide a plurality of active openings, wherein each of the plurality of active openings forms an active gap between the active disk element and the associated active seat that is inserted within the head of the housing of the adsorbent bed unit.

21. The swing adsorption system of claim 18, wherein the one or more actively-controlled poppet valves comprise a first actively-controlled poppet valve and a second actively-controlled poppet valve; wherein the first actively-controlled poppet valve is configured to provide a first feed flow path for a stream through a first active opening prior to providing a second flow path through a second opening associated with the second actively-controlled poppet valve.

22. The swing adsorption system of claim 18, wherein the one or more actively-controlled poppet valves is configured to move the active disk element away from the adsorbent bed to form a gap between the active disk element and the associated active seat.

23. The swing adsorption system of claim 18, wherein each of the one or more passively-controlled valves further comprise a biasing mechanism associated with at least one passive valve stem and configured to provide a passive opening between a passive disk element coupled to the at least one passive valve stem and a passive seat secured to the housing of the adsorbent bed unit.

24. The swing adsorption system of claim 23, wherein the biasing mechanism is configured to move linearly based on a pressure differential between the interior region and a conduit exceeding a specific threshold.

25. The swing adsorption system of claim 23, the one or more passively-controlled valves are configured to move the passive disk element away from the adsorbent bed to form a gap between the passive disk element and the passive seat.

26. The swing adsorption system of claim 18, wherein the one or more passively-controlled valves comprise a reed valve.

27. The swing adsorption system of claim 18, wherein the housing further comprises a first head and a second head secured to a body portion, wherein one or more actively-controlled poppet valves and the one or more passively-controlled valves are secured to one of the first head and the second head.

28. The swing adsorption system of claim 27, wherein the first head has a plurality of compartments formed by a structural element to isolate fluids in the different compartments from other compartments.

29. The swing adsorption system of claim 28, wherein the structural element is radially formed through the first head.

30. The swing adsorption system of claim 28, wherein the structural element is circularly formed through the first head.

* * * * *